US006754759B1

(12) United States Patent
Cook et al.

(10) Patent No.: US 6,754,759 B1
(45) Date of Patent: Jun. 22, 2004

(54) TRANSFER OF INFORMATION BETWEEN DEVICES ON DIFFERENT BUSES

(75) Inventors: Colin N. B. Cook, Lindon, UT (US); Warren K. Unice, Sandy, UT (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/520,802

(22) Filed: Mar. 8, 2000

(51) Int. Cl.[7] .................. G06F 13/14; G06F 15/177; G06F 12/10

(52) U.S. Cl. .................. 710/305; 711/203; 713/2; 345/740

(58) Field of Search ................. 710/126, 8, 305, 710/307; 711/203; 713/1, 2; 345/619; 709/224; 358/1.15; 717/171

(56) References Cited

U.S. PATENT DOCUMENTS

| | | | | | |
|---|---|---|---|---|---|
| 5,339,395 | A | * | 8/1994 | Pickett et al. ............... | 710/305 |
| 5,710,892 | A | * | 1/1998 | Goodnow et al. .......... | 710/307 |
| 5,715,410 | A | * | 2/1998 | Kim ........................... | 710/305 |
| 5,732,212 | A | * | 3/1998 | Perholtz et al. ............ | 709/224 |
| 5,732,268 | A | * | 3/1998 | Bizzarri ....................... | 713/2 |
| 5,835,760 | A | * | 11/1998 | Harmer ....................... | 713/2 |
| 5,887,164 | A | * | 3/1999 | Gupta ........................ | 709/222 |
| 5,911,051 | A | * | 6/1999 | Carson et al. .............. | 710/107 |
| 6,023,507 | A | * | 2/2000 | Wookey ..................... | 709/224 |
| 6,108,492 | A | * | 8/2000 | Miyachi .................... | 358/1.15 |
| 6,195,734 | B1 | * | 2/2001 | Porterfield ................. | 711/202 |
| 6,311,245 | B1 | * | 10/2001 | Klein ......................... | 345/619 |

FOREIGN PATENT DOCUMENTS

| JP | 07309064 A | * | 11/1995 | ............ B41M/5/26 |
|---|---|---|---|---|

OTHER PUBLICATIONS http://users.erols.com/jhuffake/ref/dod2post.html, "Tech Talk: System POST," Bob Sherman, last update Jun. 28, 1999, 3 pp., accessed and printed Feb. 10, 2000.
http://agent.microsoft.com/hwdev/BUSBIOS/optROM.htm, "Windows 2000 and Unreported Memory from Option ROMS," accessed and printed Feb. 10, 2000, 2 pp.
http://www.intel.com.tw/support/desktopmgmt/pxepd-k.htm, Wired for Management (WfM), Intel (R) Preboot Execution Environment (PXE) PDK, accessed and printed Feb. 10, 2000, 3 pp.
http://www.firmware.com/support/bios/shadow.htm, "What is BIOS Shadowing?," accessed and printed Feb. 10, 2000, 2 pp.
http://www.pcisig.com/reflector/msg00267.html, "Re: PCI and Expansion ROM," accessed and printed Feb. 9, 2000, 3 pp.
http://msdn.microsoft.com/library/specs/S1CE6E.HTM, "Appendix B: Device Driver Initialization Model," accessed and printed Feb. 8, 2000, 2 pp.
http://msdn.microsoft.com/library/specs/S1CE58.HTM, "1.3 Elements of the Plug and Play BIOS architecture," accessed and printed Feb. 8, 2000, 1 p.

(List continued on next page.)

Primary Examiner—Glenn A. Auve
Assistant Examiner—Christopher E. Lee
(74) Attorney, Agent, or Firm—Pillsbury Winthrop LLP

(57) ABSTRACT

A system, method, and apparatus according to an embodiment of the invention uses a processor to transfer information from a first device to a common area. The information is then transferred from the common area to a second device, thereby bypassing restrictions that may impede a transfer of the information directly from the first device to the second device. In an exemplary implementation, a PCI card initiates the transfer of information from a video frame buffer of an AGP video card to a memory buffer on the PCI card, using an interrupt handler loaded during configuration of the PCI bus.

25 Claims, 24 Drawing Sheets

OTHER PUBLICATIONS http://www.intel.com/network/demos/LANDesk_srvr_mgr_demo/em_2.htm, "LANDesk Server Manager Pro—The Intel (R) Remote Management Card 2," accessed and printed Aug. 24, 2000, 1 p.
http://www.tyan.com/support/html/agp.html, "AGP FAQ," accessed and printed Aug. 5, 1999, 1 p.
http://www.tomshardware.co.kr/agp-perf.html, "Does AGP Really Improve Performance?," Bert McComas, accessed and printed Aug. 5, 1999, 6 pp.
http://developer.intel.com/design/bridge/, "PCI-to-PCI Bridge Products," accessed and printed Aug. 5, 1999, 2 pp.
"Accelerated Graphics Port Interface Specification," Revision 2.0, Intel Corporation, May 4, 1998, 29 pp.
"6. System Configuration and A.G.P. Initialization," Revision 2.0, Oct. 3, Corporation, pp. 243–259.
"VT82C597/VT82C597AT," VIA Technologies Inc., Revision 1.0, Oct. 3, 1997, pp. include Table of Contents, p. 4 and 11–17.
http://www.microsoft.com/hwdev/pci/vgacard.htm, "Configuring PCI-to-PCI Bridges with VGA Cards," accessed and printed Aug. 24, 1999, 4 pp.
http://support.premiopc.com/vedge/440bx_.htm, "Virtual Edge—Intel 440BX AGPset Block Diagram," accessed and printed Aug. 27, 1999, 1 p.
http://heaven.hamline.edu/LDP/LDP/tkl/dd/pci.html, "PCI," Chapter 6, accessed and printed Aug. 27, 1999, 14 pp.
http://gateway.centre.com/faqpnpp.htm, "Product Help Desk Ethernet Adapter Cards," accessed and printed Aug. 27, 1999, pp. 1 and 2.
http://members.hyperlink.net.au/~chart/pci.htm, "PCI Information," accessed and printed Aug. 27, 1999, 1 p.
http://www.microsoft.com/hwdev/busbios/pciirq.htm, "PCI IRQ Routing Table Specification," accessed and printed Aug. 27, 1999. 6 pp.
http://www.sanders.com/hpc/ArchGuide/Elements/Commune/PC.html, "PC Buses13 PCI," accessed and printed Aug. 27, 1999, 1 p.
http://members.hyperlink.net.au/~chart/whatpci.htm, "What is PCI anyhow, and why write about it," accessed and printed Aug. 27, 1999, 3 pp.
"PCI Local Bus Specification Revision 2.1 vs. Revision 2.0," AP–753 Application Note, Intel Corporation, Mar. 1997, 8 pp.
http://www.onement.com/2fast4u/avmbkgrd.html, "Bus Mastering," accessed and printed Aug. 11, 1999, 1 p.
http://support.intel.com/support/chipsets/PC1001.HTM, "Efficient use of PCI," accessed and printed Aug. 24, 2000, 11 pp.
http://www.Isilogic.com/graphics/5_9h3.gif, "Figure 3. MPEG-2/AC-3 Host Port on PCI," accessed and printed Aug. 11, 1999, 1 p.
http://www.Isilogic.com/graphics5_9h4.gif, "Figure 4. Standalone PCI Solution," accessed and printed Aug. 11, 1999, 1 p.
http://www.Isilogic.com/graphics/5_9h5.gif, "Figure 5. Bus Utilization model," accessed and printed Aug. 11, 1999, 1 p.
Intel® LANDesk® Server Manager 6 Administrator's Guide, Intel Corporation, 1999, 75 pp.
Intel® LANDesk® Server Manager 6 Installation Guide, Intel Corporation, 1999, 47 pp.
http:www.comymedia.com/intel/serverman.html, "Intel LANDesk® Server Manager Products," last accessed Aug. 15, 1999, 7 pp.
http://www8.zdnet.com/pcmag/pclabs/nettools/1719/bench3.html, Jeffrey Witt, "Server Management, Servicing Servers", last accessed Aug. 15, 1999, 3 pp.
http://www.ami.com/ami/server-solutions.html, Remote Server Assistance, last accessed Aug. 10, 1999, 1 p.
http://www.ami.com/utilities/s780spec.html, MegaRAC™ (Series 780) Remote Server Management Motherboard, last accessed Aug. 10, 1999, 4 pp.
American Megatrends MegaRAC™ Hardware Guide Preliminary DRAFT MAN–780, Dec. 18, 1998, 24 pp. (pp. i–vi and 1–18).
http://han-en-jana.rc.tudelft.nl/interupt/out-2200.htm, "Diskless Boot Hook (Start Cassette Basic," accessed and printed Feb. 11, 2000, 1 p.
http://avocetsystems.com/softaid/articles/aintrp.shtml, "Interrupt Predictability," accessed and printed Feb. 14, 2000, 6 pp.
http://msdn.microsoft.com/library/ddkdoc/ntddk/native/ddk/pg/src/101initl_1.htm, "1.1 Loading the System," accessed and printed Feb. 14, 2000, 2 pp.
http://msdn.microsoft.com/library.ddkdoc/ntddk/native/ddk/pg/src/101initl_7.htm, "1.2.5 Controlling Driver Load Order," accessed and printed Feb. 7, 2000, 3 pp.
http://msdn.microsoft.com/library/ddkdoc/ntddk/native/ddk/kg/src/16issues_31.htm, "16.8.1.2 Load–control Sets for NT Drivers," accessed and printed Feb. 7, 2000, 3 pp.
http://support.microsoft.com/support/kb/articles/Q152/0/44.asp, "HOWTO: Create a PCI Device Driver for Windows NT," accessed and printed Feb. 7, 2000, 4 pp.
http://msdn.microsoft.com/library/specs/S1CE6D.HTM, "Genetic Option ROM Headers," Appendix A, accessed and printed Feb. 9, 2000, 2 pp.
http://www.xeon.com/ial/wfm/wfm20/design/pxedt/index.htm, "Desktop Preboot Execution Environment (PXE) for Desktop Systems," accessed and printed Feb. 10, 2000, 2 pp.
Compaq Computer Corporation, Phoenix Technologies Ltd., Intel Corporation, "BIOS Boot Specification, Version 1.01," Jan. 11, 1996, 46 pp.
http://msdn.microsoft.com/library/specs/S1CE5F.HTM, "3.1 Option ROM Header," accessed and printed Feb. 8, 2000, 2 pp.
http://msdn.microsoft.com/library/specs/s1ce61.htm, "3.3 Option ROM Initialization," accessed and printed Feb. 8, 2000, 2 pp.
http://msdn.microsoft.com/library/specs/S1CE62.HTM, "3.4 Option ROM Initialization flow," accessed and printed Feb. 8, 2000, 1 p.
http://msdn.microsoft.com/library/specs/S1CE63.HTM, "3.5 ISA Option ROMs and Resource Mapping," accessed and printed Feb, 8, 2000, 1 p.
http://www.viking.delmar.edu/courses/CIS312J/Ebook/wrh05.htm, "BIOS Extensions" (2 pp.), ROM Shadowing (1 p.), "Structure" (2 pp.), Winn L. Rosch Hardware Bible, Electronic Edition, Chap. 5, accessed and printed Feb. 9, 2000.
http://msdn.microsoft.com/library/specs/S1CE59.HTM, "1.4 Installation Structure," accessed and printed Feb. 8, 2000, 1 p.

http://msdn.microsoft.com/library/specs/S1C973.HTM, "2.0 System BIOS Installation," accessed and printed Feb. 8, 2000, 1 p.
http://msdn.microsoft.com/library/specs/S1CE5A.HTM, "2.1 System BIOS POST Requirements," accessed and printed Feb. 8, 2000, 4 pp.
http://msdn.microsoft.com/library/spec/S1CE5B.HTM, "2.2 Plug and Play ISA Card Support," accessed and printed Feb. 8, 2000, 2 pp.
http://msdn.microsoft.com/library/specs/S1CE5C.HTM, "2.3 BIOS POST Option ROM initialization," accessed and printed Feb. 8, 2000, 2 pp.
http://msdn.microsoft.com/library/specs/S1CE5D.HTM, "2.4 Transferring Control to the Operating System," accessed and printed Feb. 8, 2000, 1 p.
http://msdn.microsoft.com/library/specs/S1CE5E.HTM, "2.5 POST Execution flow," accessed and printed Feb. 8, 2000, 2 pp.
http://msdn.microsoft.com/library/specs/S1C979.HTM, "3.0 Option ROM Support," accessed and printed Feb. 8, 2000, 1 p.
http://www.pcisig.com/reflector/msg00367.html, "Re: PCI I/O Space Consumption Limitation," accessed and printed Feb. 9, 2000, 3 pp.
http://www.horizon-tech.fr/articles/other/pci/pci.htm, "Application Note, Plug and Play Operation of the PCI Local Bus," accessed and printed Feb. 8, 2000, 6 pp. + Figs. 1 and 2 (. . . /pci/image1.jpg, . . . /pci/image2.jpg).
http://www.diplan.de/~martin/intel/pnp/bio1_30.htm, Compaq Computer Corp., Pheonix Technologies Ltd., and Intel Corporation, "Plug and Play BIOS Specification, Sec. 3," ver. 1.0A, May 5, 1994, 8 pp., accessed and printed Feb. 9, 2000.
http://stommel.tamu.edu/~baum/linux/LDP/LDP/tkl/dd/pci.html, "Chapter 6, PCI," accessed and printed Dec. 27, 1999, 15 pp.
http://www.intel.com/network/demos/LANDesk_srvr_mgr_demo/em.htm, "LANDesk Server Manager Pro—The Intel (R) Remote Management Card," accessed and printed Aug. 5, 1999, 1 p.
"Developer Kit Tips Application Note" PCI Local Bus, Applied Micro Circuits Corporation, Revision 1, Jan. 20, 1998, 7 pp.
"The Expansion ROM Option Application Note," Applied Micro Circuits Corporation Revision 1, Jun. 2, 1998, 9 pp.
http://www.mega-tokyo.com/os/os-faq-pci.html, "Operating Systems FAC::PCI," accessed and printed Dec. 29, 1999, 3 pp.
http://www.execpc.com/~geezer/os/pm.htm, "Protected Mode Tutorial," accessed and printed Dec. 29, 1999, 5 pp.
http://www.byte.com/art/9402/sec10/art2.htm, "Inside the PCI Local Bus," dated Feb. 1994, accessed and printed Dec. 30, 1999, 9 pp.
http://www.internals.com/articles/protmode/introduction.htm, "Introduction to Protected-Mode," Yariv Kaplan, accessed and printed Aug. 12, 1999, 3 pp.
http://www.internals.com/articles/protmode/realmode.htm, "Real-Mode Memory Management," Yariv Kaplan, accessed and printed Aug. 12, 1999, 3 pp.
http://www.internals.com/articles/protmode/protmode.htm, "Protected-Mode Memory Management," Yariv Kaplan, accessed and printed Aug. 12, 1999, 8 pp.
http://www.internals.com/articles/protmode/interrups.htm, "Interrupts and Exceptions," Yariv Kaplan, accessed and printed Aug. 12, 1999, 7 pp.
Intel, "System Address Map," 82443BX Host Bridge Datasheet, pp. 5–27 through 5–36.
http://www.adaptec.com/technology/whitepapers/pcibus.html, "PCI Bus Overview," accessed and printed Aug. 11, 1999, 10 pp.*
http://www.mkdata.dk/click/module2d.htm, "An Illustrated Guide to chip sets," accessed and printed Aug. 27, 1999, 1 p.*
http://www.han.de/~gero/netboot/archive/msg01592.html, "Re: v0.9.0d Error in PCI image.rom generation.," accessed and printed Aug. 24, 2000, 3 pp.*
http://developer.intel.com/techology/agp/tutorial/chapt_1.htm, "3D Graphics on Current Generation PCs, Accelerated graphics Port Technology," AGP Tutorial: Chapter 1, accessed and printed Aug. 24, 2000, 3 pp.*
http://developer.intel.com/technology/agp/tutorial/chapt_2.htm, "3D Graphics on Next Generation PCs, Accelerated graphics Port Technology," AGP Tutorial: Chapter 2, accessed and printed Aug. 24, 2000, 2 pp.*
http://developer.intel.com/technology/agp/tutorial/chapt_3.htm, "AGP Data Transfers Modes, Accelerated Graphics Port Technology," AGP Tutorial: Chapter 3, accessed and printed Aug. 24, 2000, 1 p.*
http://developer.intel.com/technology/agp/tutorial/chapt_4.htm, "AGP Memory Mapping, Accelerated Graphics Port Technology," AGP Tutorial: Chapter 4, accessed and printed Dec. 8, 2000, 2 pp.
http://developer.intel.com/technology/agp/tutorial/chapt_5.htm, "A Summary of AGP's Benefits, Accelerated Graphics Port Technology," AGP Tutorial: Chapter 5, accessed and printed Aug. 24, 2000, 1 p.
http://developer.intel.com/technology/ago/tutorial/chapt_6.htm, "What This Means for Software Developers, Accelerated Graphics Port Technology," AGP Tutorial: Chapter 6, accessed and printed Aug. 24, 2000, 3 pp.
http://www.intel.com/pc-supp/platform/agfxport/ecr.htm, "Accelerated Graphics Port Interface Specification," accessed and printed Aug. 5, 1999, 1 p.

* cited by examiner

TRANSFER OF INFORMATION BETWEEN DEVICES ON DIFFERENT BUSES

BACKGROUND OF THE INVENTION

1. Field of the Invention

This invention relates to the transfer of information from one device to another. Specifically, this invention relates to the transfer of information from a first device to a second device, when access by the second device to the first device is restricted.

2. Description of Related Art and General Background

A computer 100a as shown in FIG. 1 comprises a processor 110 and memory 120. Processor 110 may comprise one or more microprocessors, for example, while memory 120 may comprise semiconductor memory (read-only memory (ROM) and/or random-access memory (RAM)) arranged in one or more hierarchical levels (e.g. Level 1 cache, Level 2 cache, main memory, Basic Input/Output System (BIOS)).

A computer supports input of information from and/or output of information to one or more peripheral hardware devices 200a, 200b, 200c. Examples of such devices include video displays; keyboards; devices for input and/or output of audio and/or video; and interfaces for networks, secondary storage media such as disk and/or tape drives, printers, and the like. Several such devices may be linked to the computer through a system bus 300, which may be a PCI (Peripheral Connect Interface) bus as defined by PCI Local Bus Specification, rev. 2.2, PCI Special Interest Group, Hillsboro, Oreg. These devices may be either integrated into the computer or may be removably connected to system bus 300 having a system bus controller 310 (see FIGS. 1 and 2) through a bus connector provided on the device.

It is desirable in many instances for a computer to operate as expected even when it is unattended (i.e. even when a user is not present to control the computer directly through its console). For example, a user may schedule a large computational task to execute overnight. Alternatively, the computer may be connected to a network as a server, operating largely unattended while it supports applications and/or communications for a number of client machines.

When an unattended computer fails to function as desired, it may be inconvenient or impossible for a technician to reach the console immediately in order to diagnose and correct the problem, and the resulting downtime may be costly. To enable timely and effective system management, it is desirable to be able to monitor the operation of a computer from a remote location. Specifically, it is desirable to be able to view the video output of a computer remotely.

One form of a peripheral device that supports a limited remote capability for a computer 100a as shown in FIG. 1 is a remote monitoring device (RMD) 200a. Such a device 200a connects to system bus 300 as shown in FIG. 1 and transmits information to a remote user over a telephone line (not shown). RMD 200a may be equipped with its own processor, allowing it to operate independently of host processor 110 and access information stored on video controller 200b directly over system bus 300.

It is desirable to use a local bus to support high-bandwidth transfers of information such as video output. One example of such a bus is the Accelerated Graphics Port (AGP) bus as defined in AGP Specification, rev. 2.0, May 4, 1998, Intel Corp. (Santa Clara, Calif.). A local bus 500 may have a dedicated bus controller 510 as shown in the host computer 100b of FIG. 2, or control of the local and system buses may be integrated into a single bus controller 610 (where information exchanged between processor 110 and memory 120 does not pass through the bus controller) or 620 (where information may be exchanged between processor 110 and memory 120 via the bus controller) as shown in FIGS. 3 and 4, respectively. By way of example, controller 620 may be implemented using one among the 440BX, 440LX, 440EX, 440MX, 810, 820, or 840 chipsets manufactured by Intel Corp. (Santa Clara, Calif.), wherein system bus 300 is a PCI bus.

Because the local and system buses operate at different speeds, a device on system bus 300 (such as RMD 200a) cannot directly access a device on local bus 500. Moreover, in order to protect the performance of local bus 500, the bus controller may be designed to block requests for access to devices on the local bus by devices on system bus 300. Consequently, in a case where the host computer uses a local bus video controller 400 such as an AGP video card or an embedded AGP video device, remotely monitoring the video output of the host computer with a device on system bus 300 has been considered to be impossible without the support of the operating system of computer 100c, 100d. For example, such remote monitoring has been considered to be impossible (1) before an operating system of computer 100c, 100d boots and (2) after the operating system has crashed.

It is desirable for a remote monitoring device on a system bus to be able to access the memory of a video controller on a local bus during substantially all stages of operation of the host computer, including periods during which the host computer's operating system has not yet loaded, has loaded incorrectly, or has crashed.

DETAILED DESCRIPTION OF THE INVENTION

Figure 5:
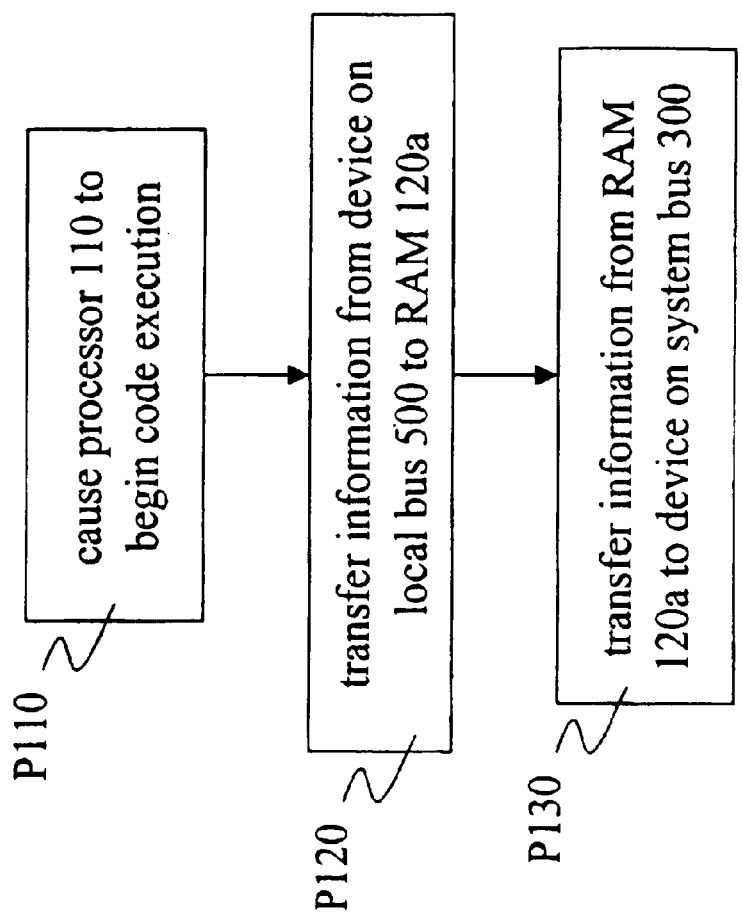
FIG. 5 shows a flow chart of a method according to an embodiment of the invention.
Figure 6:
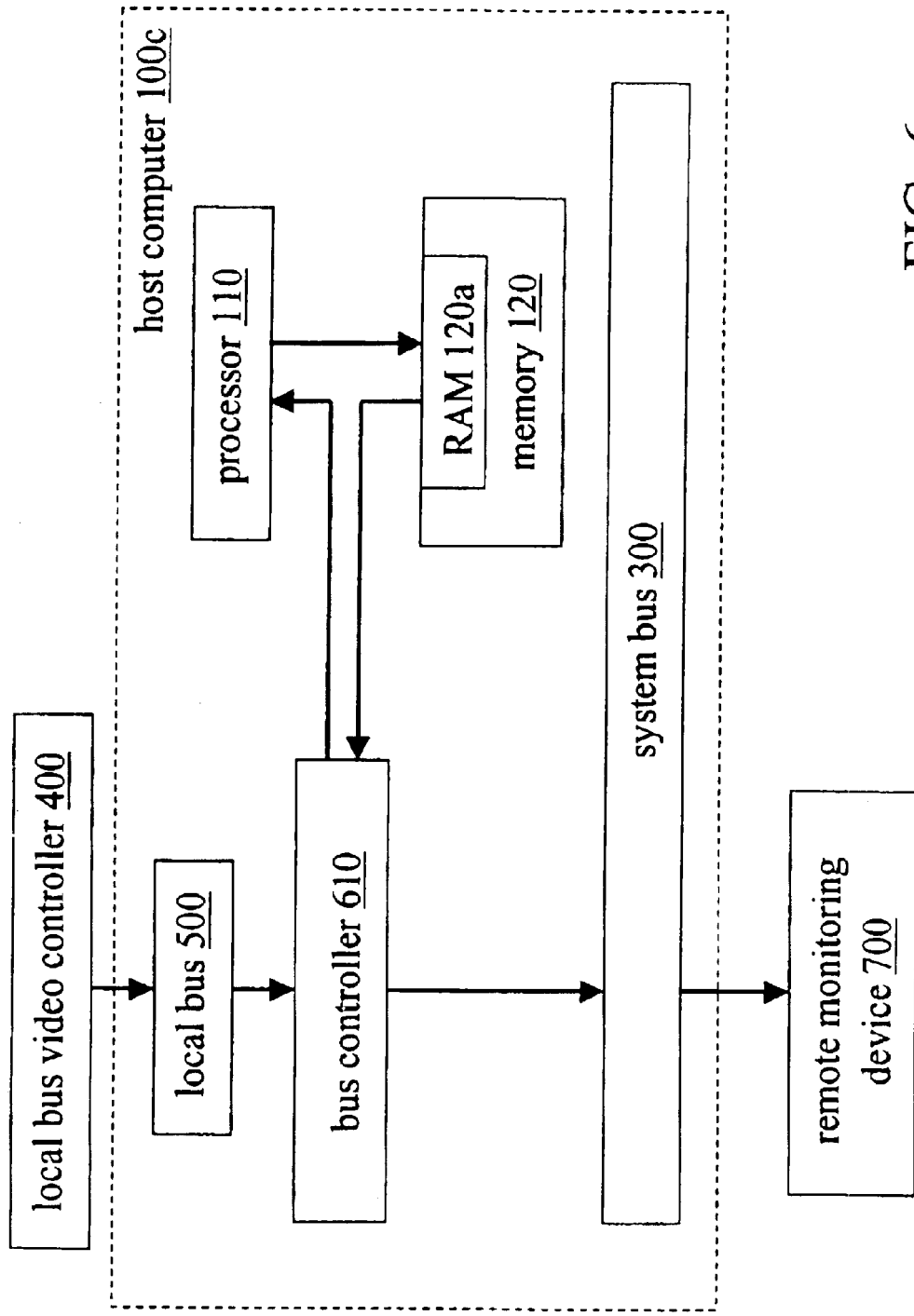
FIG. 6 shows a block diagram of a system according to an embodiment of the invention.
Figure 7:
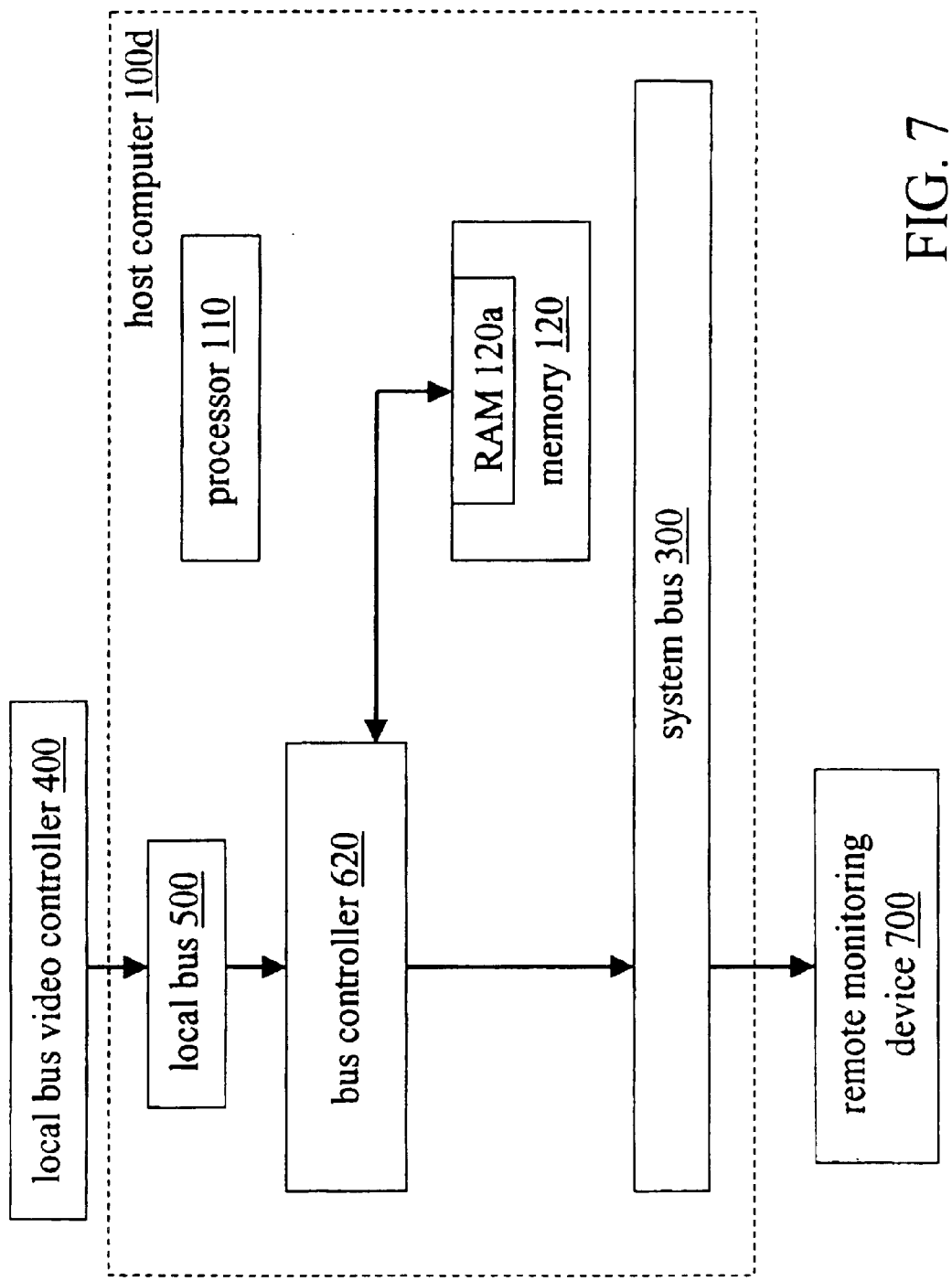
FIG. 7 shows a block diagram of a system according to an embodiment of the invention.

FIG. 5 shows a flowchart for a method according to an embodiment of the invention. Event P110 occurs before an operating system of computer 100c, 100d begins to boot. This event causes processor 110 to begin to execute a specified sequence of program instructions or 'code' for transferring information. In executing this code (task P120), processor 110 causes information to be transferred from a device on local bus 500 (e.g. local bus video controller (LBVC) 400) to a RAM portion 120a of memory 120. In task P130, the information is transferred again from RAM 120a to a device on system bus 300 (e.g. RMD 700 as shown in FIGS. 6 and 7). In this way, a transfer of information from the device on the local bus to the device on the system bus may be initiated or even completed before an operating system of computer 100c, 100d begins to boot.

Event P110 may occur periodically, with occurrences being separated by a predetermined number of minutes, seconds, or timer clicks, for example. Alternatively, event P110 may occur according to a schedule: upon completion of a predetermined stage of the Power-On Self Test (POST), for example, or upon completion of the BIOS initialization of computer 100c, 100d. Alternatively, event P110 may occur in response to a condition (such as the detection of an error or fault) or an external signal (such as the reception by RMD 700 of a signal sent by a remote user requesting an update of video information from LBVC 400).

Figure 1:
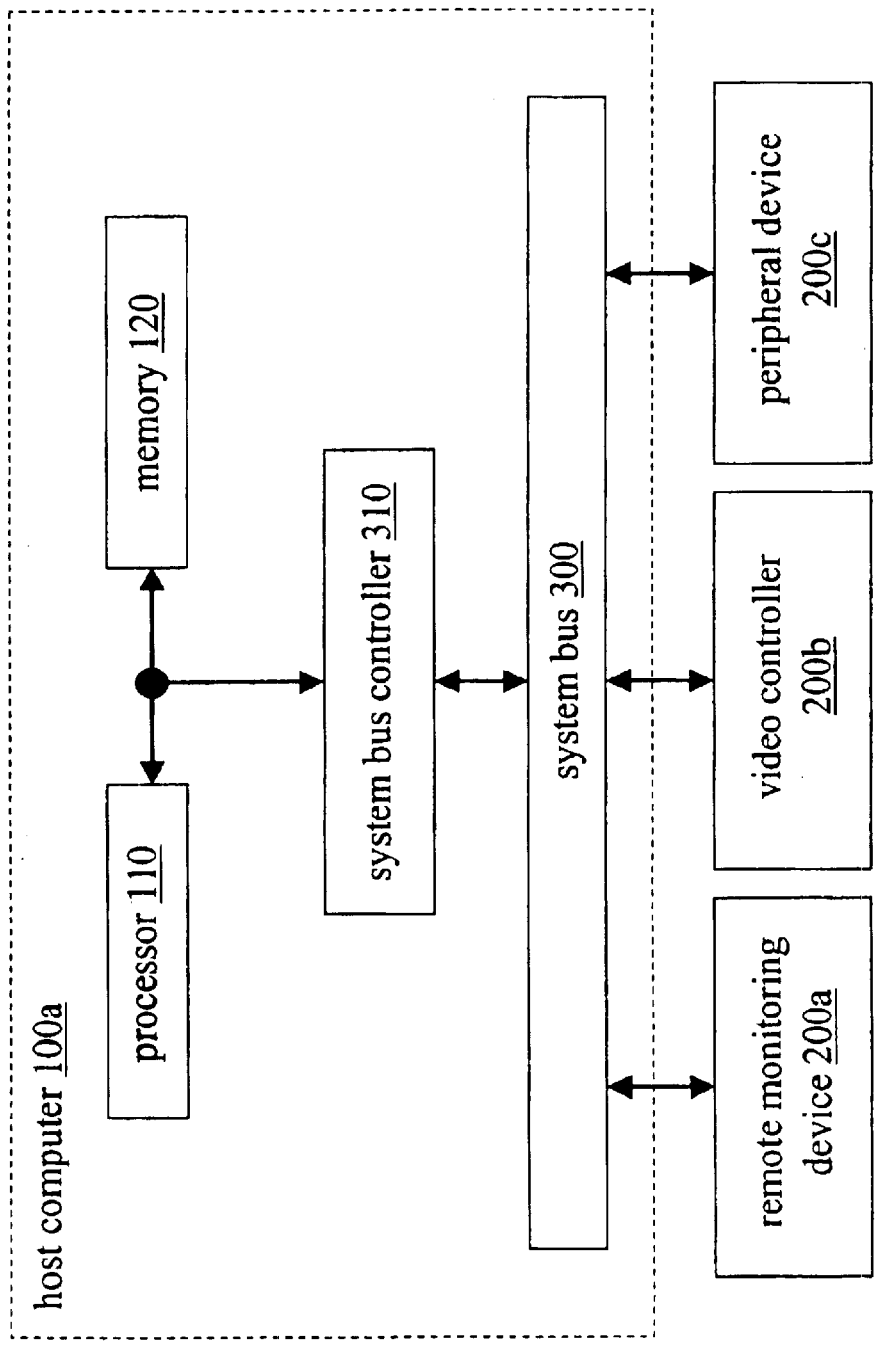
FIG. 1 shows a block diagram of a computer having a system bus and a remote monitoring device.
Figure 2:
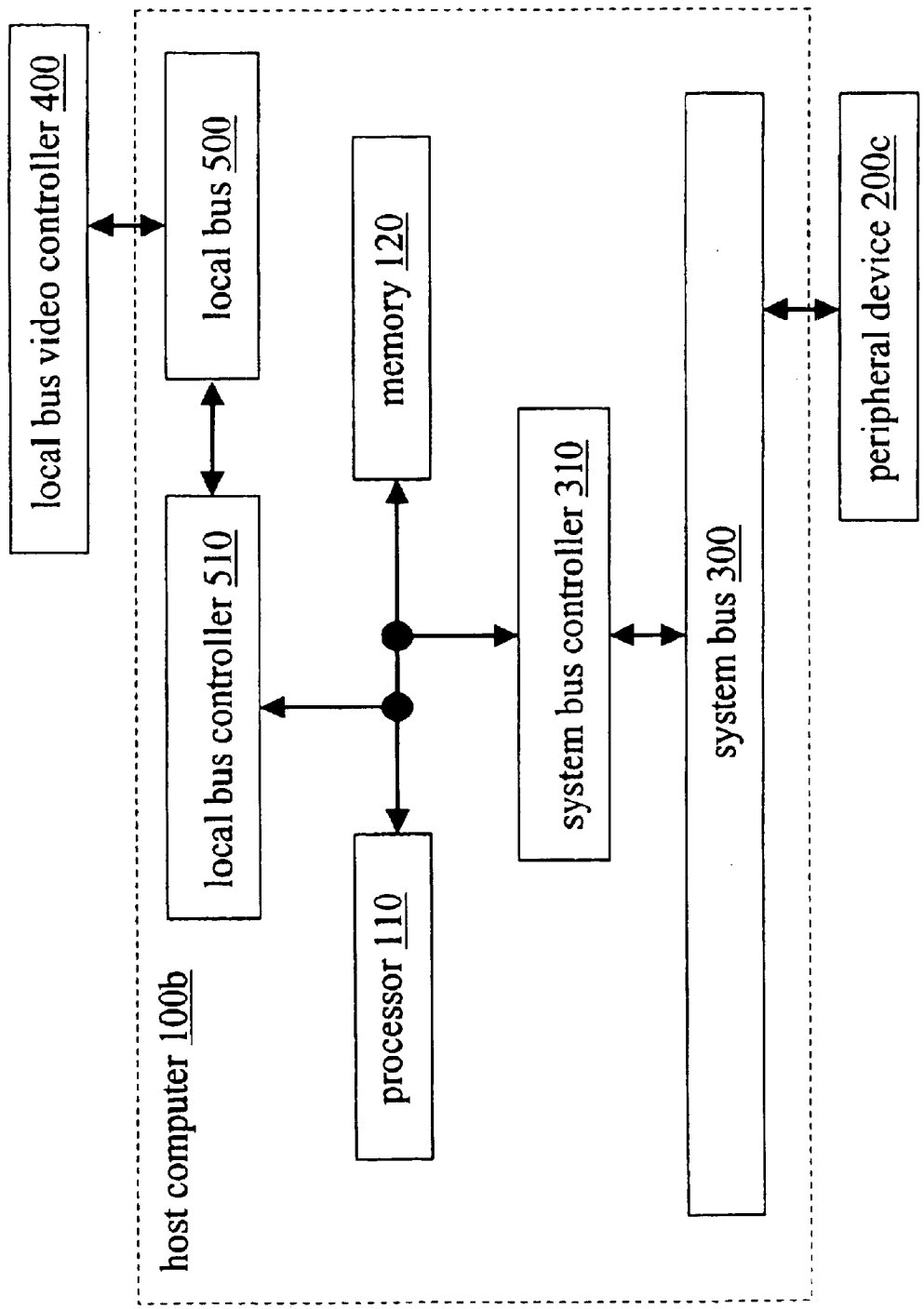
FIG. 2 shows a block diagram of a computer having local and system buses and a device on each bus.
Figure 3:
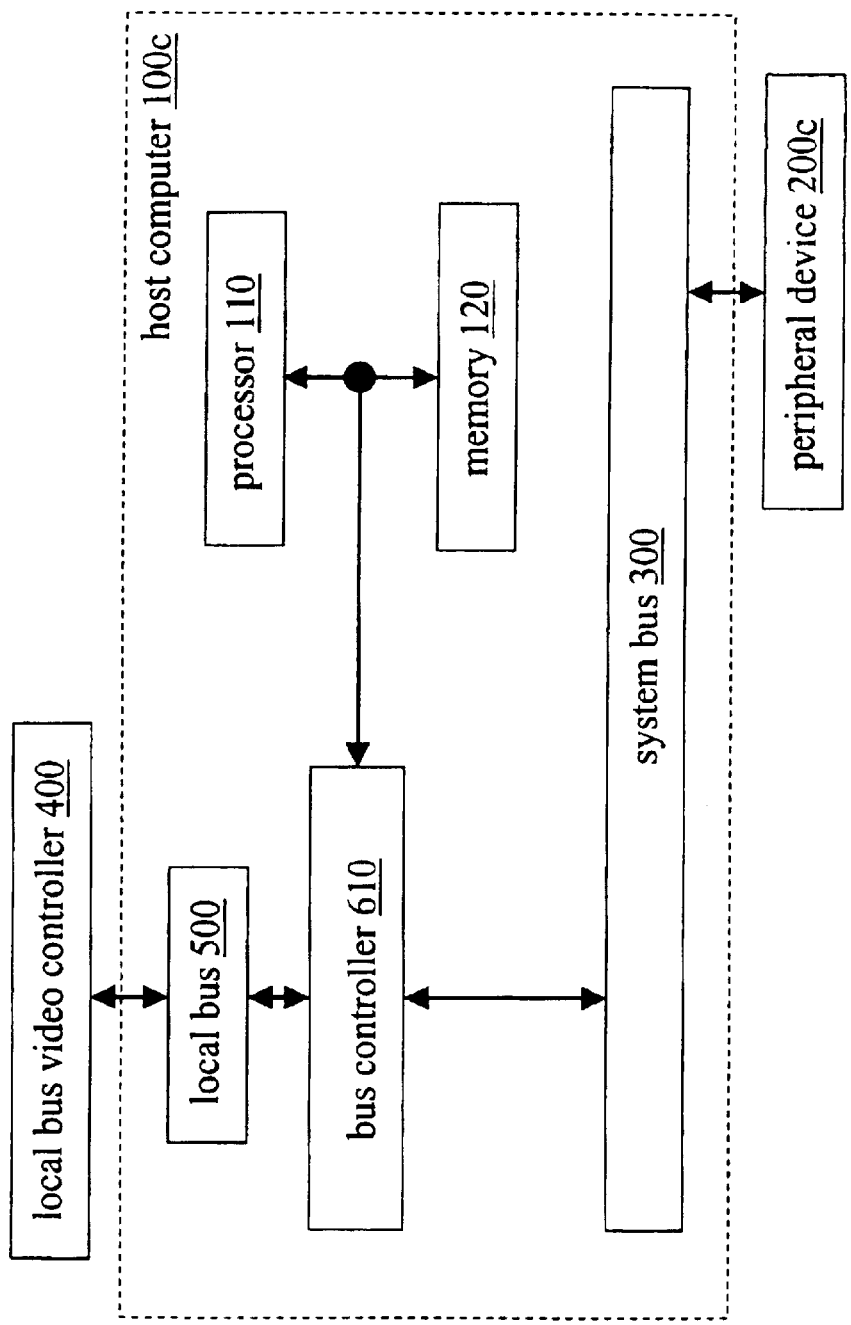
FIG. 3 shows a block diagram of a computer having local and system buses and a device on each bus.
Figure 4:
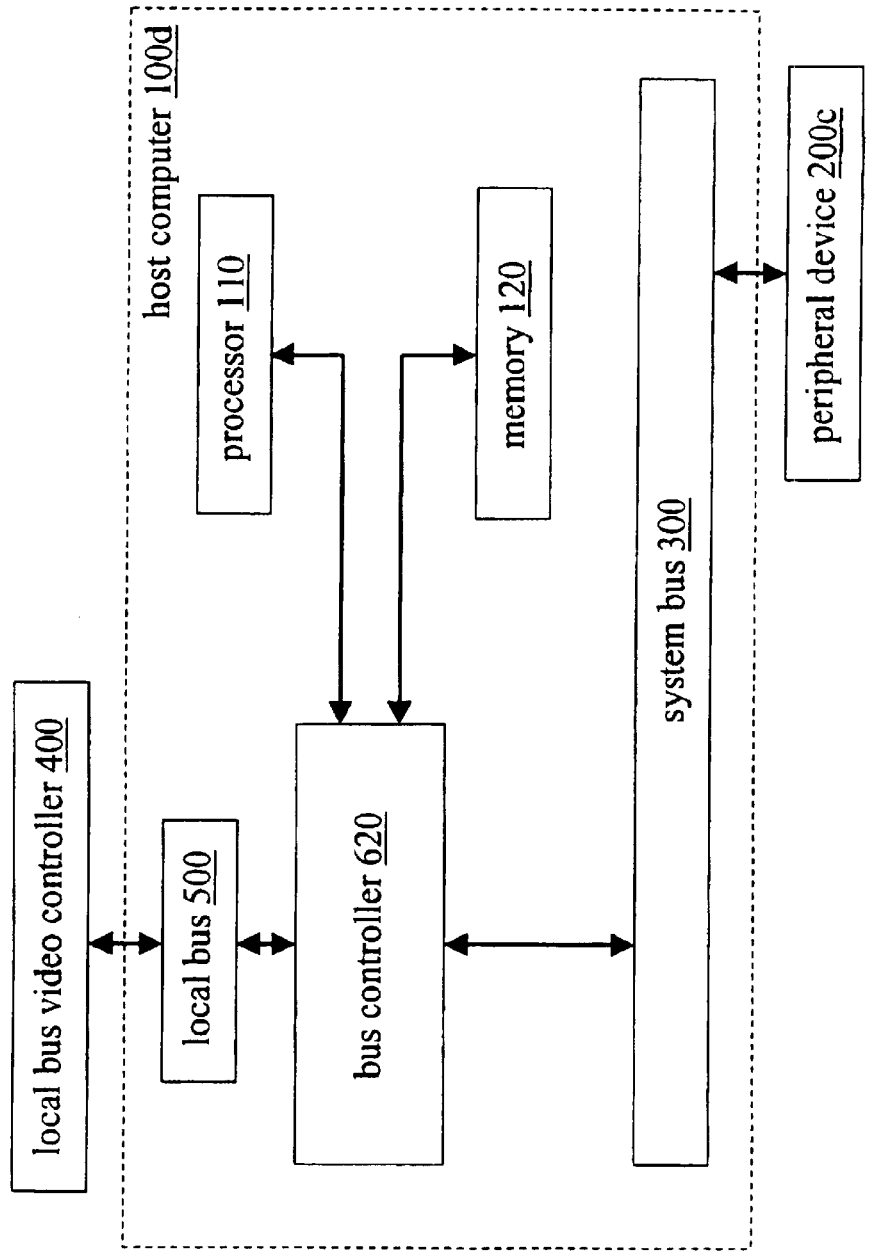
FIG. 4 shows a block diagram of a computer having local and system buses and a device on each bus

By way of example, FIG. 6 shows the path of the information from local bus video controller (LBVC) 400 to RMD 700 when the method of FIG. 5 is used with host computer 100c of FIG. 3. FIG. 7 shows the same path when this method is used with host computer 100d of FIG. 4. System bus 300 may be a PCI bus or may conform to another established standard such as one of the following:

MCA (Micro Channel Architecture), a proprietary standard of IBM Corp. (White Plains, N.Y.);

ISA (Industry Standard Architecture) and EISA (Extended ISA), as defined in EISA Specification, Version 3.12, available from BCPR Services, Inc. (Spring, Tex.);

a variant of PCI such as Mini PCI or PCI-X, as defined in Mini PCI 1.0 and PCI-X 1.0, respectively, both available from PCI Special Interest Group;

VME and VME64, as defined in ANSI/VITA 1-1994 (VITA, Scottsdale, Ariz.), IEEE 1014-1987 (IEEE Standards, Piscataway, N.J.), or ISO/IEC15776 (International Organization for Standardization, Geneva, Switzerland);

S-Bus, a proprietary standard of Sun Microsystems (Palo Alto, Calif.); and

PC/104, and PC/104-Plus, as defined in PC/104 Specification, version 2.3, June 1996 and PC/104-Plus Specification, version 1.1, June 1997, respectively, both available from PC/104 Consortium, Mountain View, Calif.).

Figure 8:
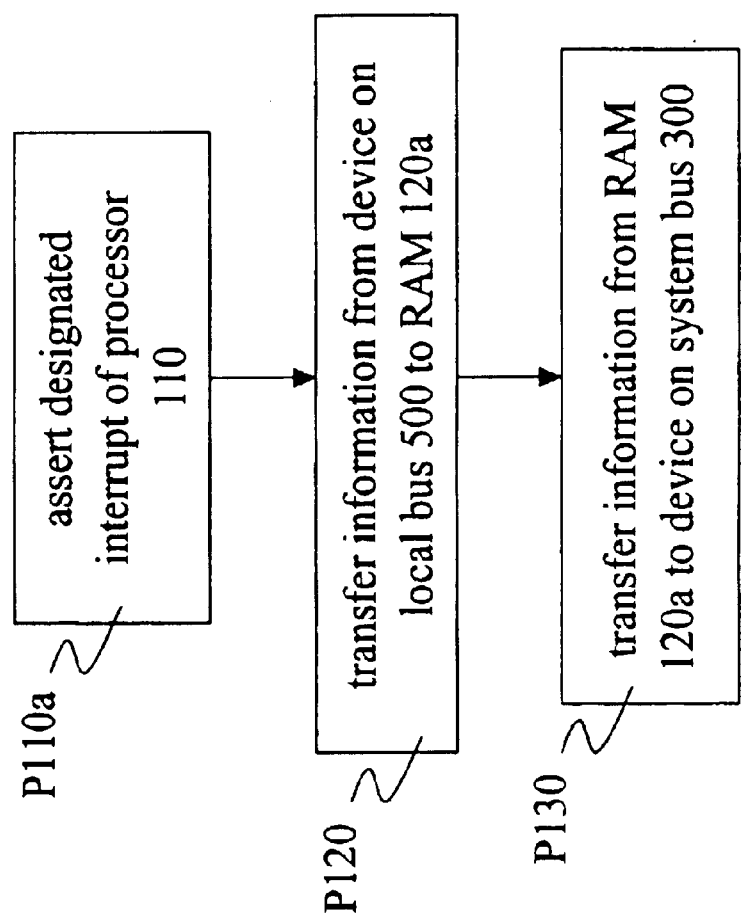
FIG. 8 shows a flow chart of a method according to an embodiment of the invention.

FIG. 8 shows one general implementation of the method of FIG. 5, wherein event P110a is the assertion of a designated interrupt of processor 110, as triggered by event P110. The vector or table entry associated with the designated interrupt is preconfigured to direct processor 110 to the starting location of the code for performing task P120. This starting location may be within ROM or RAM of memory 120 or within a memory aboard RMD 700. Configuration of the interrupt may be hard-wired; alternatively, configuration of the interrupt may be achieved, for example, during power-on initialization of computer 100, system bus 300, or RMD 700.

Figure 9:
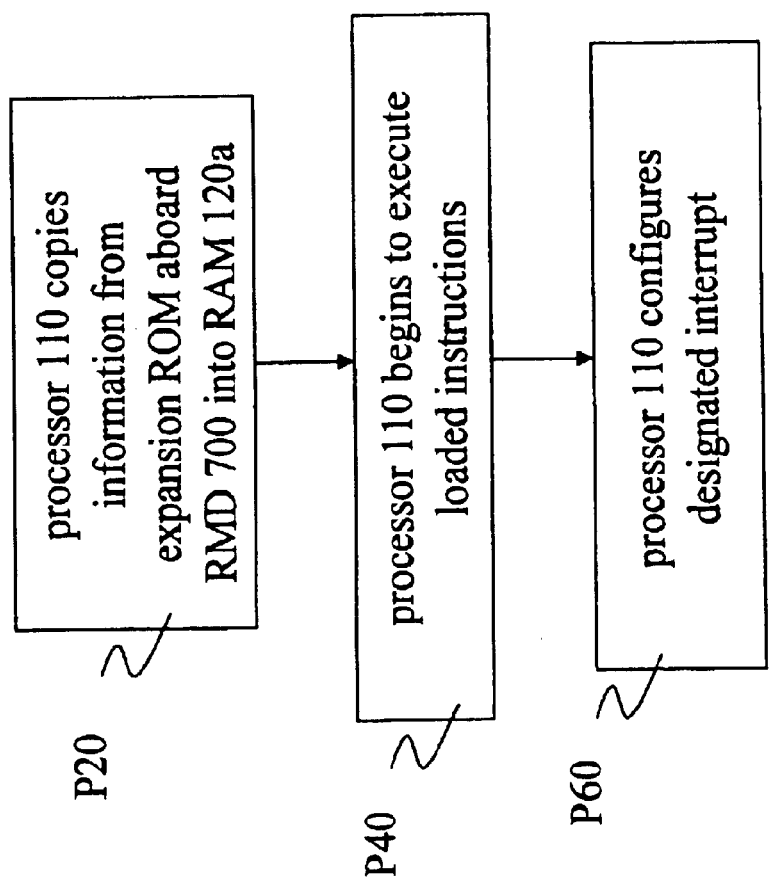
FIG. 9 shows a partial flow chart of a method according to an embodiment of the invention.

In one particular implementation as shown in FIG. 9, configuration of the interrupt occurs during a power-on configuration of system bus 300 (which may be, for example, a dynamically configurable bus such as a PCI bus). During bus configuration, processor 110 loads a block of code from an expansion ROM (or 'option ROM') aboard RMD 700 into RAM 120a (task P20 in FIG. 9). Processor 110 then executes at least a portion of the block (task P40), thereby configuring the designated interrupt to point to an interrupt service routine ('ISR') within the block of code (task P60). This ISR remains resident in RAM 120a after the configuration and includes the code for performing task P120. Such an implementation allows the method of FIG. 5 to be practiced with an existing computer 100 while avoiding a need to upgrade the computer's BIOS. Additionally, such implementation allows practice of the method of FIG. 5 to be portable with RMD 700 rather than dependent on the contents of a ROM of computer 100c, 100d.

The instructions which processor 110 begins to execute in task P40 may also cause it to perform other initialization tasks, such as the following:

Processor 110 may cause a portion of the memory space of RMD 700 to be mapped to a portion of the memory space of processor 110 to enable transfers from one memory space to the other. Processor 110 may also verify that such transfers may be performed successfully. Additionally, in a case where processor 110 executes within a limited memory space during configuration (e.g. in 'real mode' as opposed to a 'protected mode' of Intel x86 processors), processor 110 may execute instructions as necessary to obtain access to the mapped memory space. (A similar set of instructions may also be executed as a part of the ISR.)

In addition to the designated interrupt, processor 110 may allocate and/or configure other system resources such as input/output addresses for use by RMD 760.

Processor 110 may issue a notification to RMD 700 when configuration of the ISR is completed.

Loading the ISR code into RAM 120a allows processor 110 to execute the ISR more rapidly than if it remained resident only in the expansion ROM of RMD 700. Note that the transfer of code from the expansion ROM to RAM 120a may include a checksum, decryption, and/or decompression operation or the like, such that the form of the information retrieved from the expansion ROM need not literally correspond to the form of the code stored in RAM 120a.

In other implementations, the ISR may reside in a ROM aboard computer 100c, 100d (e.g. as a part of the BIOS of computer 100c, 100d), or in a ROM aboard RMD 700 (e.g. as a part of the expansion ROM), rather than within RAM 120a. Alternatively, the ISR may reside in RAM aboard RMD 700, having been copied from ROM during initialization of computer 100c, 100d, system bus 300, or RMD 700. Likewise, the code for configuring the ISR (if required) may be executed from ROM or RAM and may be a part of the BIOS of computer 100c, 100d or of an expansion ROM aboard RMD 700.

Once task P120 has been performed, some portion of the information from the local bus device (e.g. LBVC 400) is available in RAM 120a. Processor 110 then performs task P120 by executing further instructions within the ISR, thereby transferring this portion of the information from RAM 120a to RMD 700 (e.g. to an onboard RAM or communications port or buffer) or to another device on system bus 300.

Figure 10A:
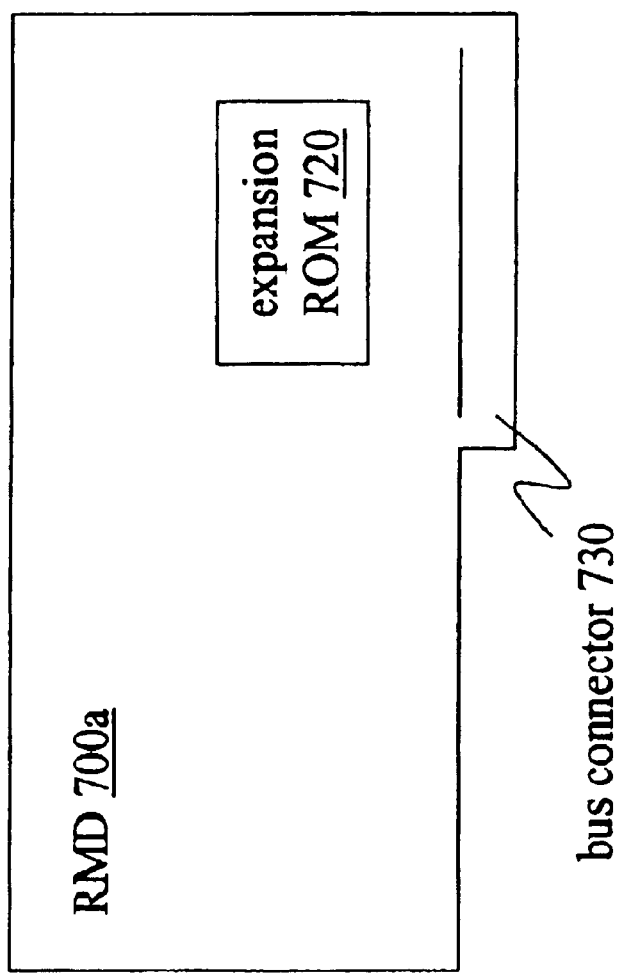
FIG. 10a shows a block diagram of an apparatus according to an embodiment of the invention.
Figure 10B:
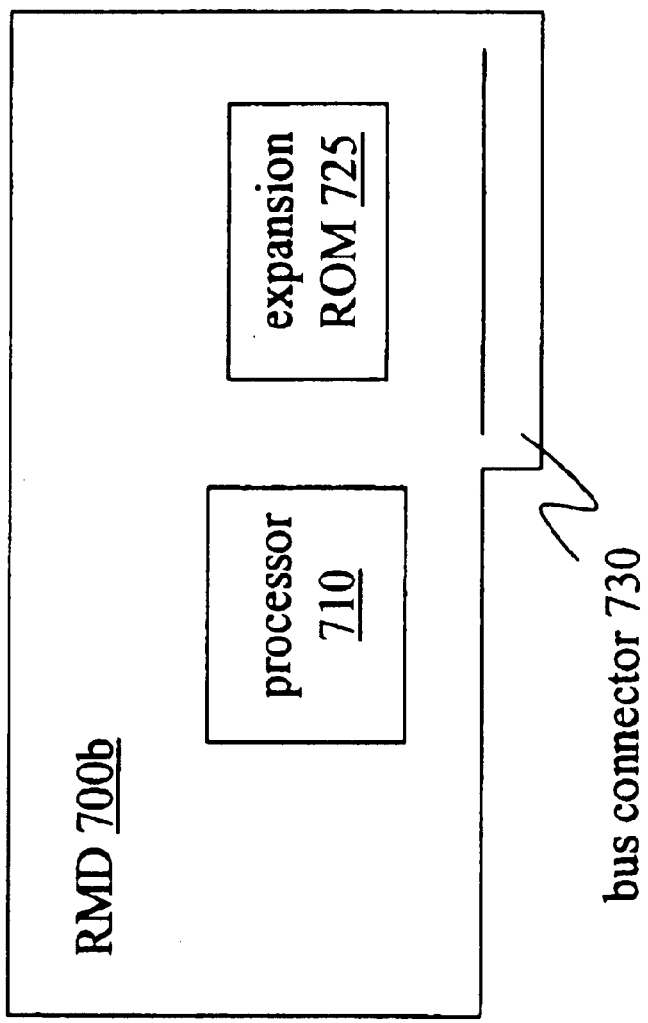
FIG. 10b shows a block diagram of an apparatus according to an embodiment of the invention.
Figure 11:
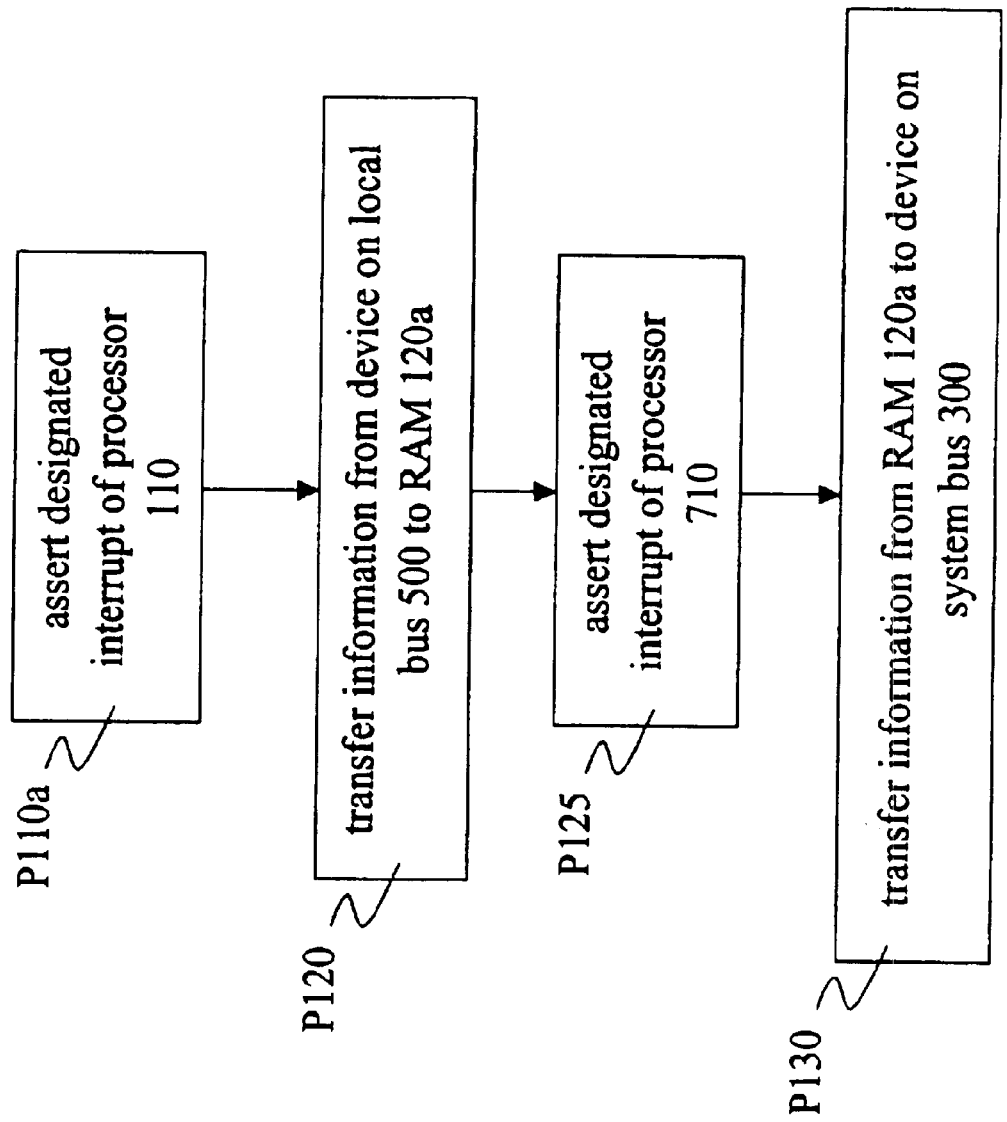
FIG. 11 shows a flow chart of a method according to an embodiment of the invention.

FIG, 10a shows an apparatus 700a according to an embodiment of the invention, including expansion ROM 720 and bus connector 730 which connects to system bus 300. As processor 110 may have many other tasks to perform, it is desirable to effect the information transfer with a minimal load on processor 110. In an alternative implementation including expansion ROM 725, processor 110 interrupts a processor 710a board RMD 700b (as shown in FIG. 10b) (task P125 of FIG. 11) and returns from the ISR (possibly after write-protecting the area of RAM 120a that stores the portion of the information). Processor 710 then executes an ISR associated with the interrupt asserted by processor 110, thereby transferring the information from buffer area 120a to RMD 700a over system bus 300 (task P130) and via bus connector 730. Processor 110 is thus released to do other work while processor 710 completes the transfer to another storage area (e.g. within RMD 700a) and/or to the remote user (e.g. by packetizing the data and forwarding it over a network or telephone line connection). Although hardware restrictions (imposed, for example, by bus controllers 610 and 620) may prevent a device on system bus 300 from obtaining the information directly from video controller 400, this implementation bypasses such restrictions by taking advantage of the features that (1) processor 110 has access to devices on local bus 500 and (2) processors 110 and 710 may both access at least some part of memory 120.

By designating a portion within RAM 120a to be the common area, the implementations described above allow processor 110 to perform the transfer to the common area as quickly as possible. However, note that practice of the invention is not limited to the use of RAM 120a (or even to the use of a portion of memory 120) as the area of common access.

Figure 12:
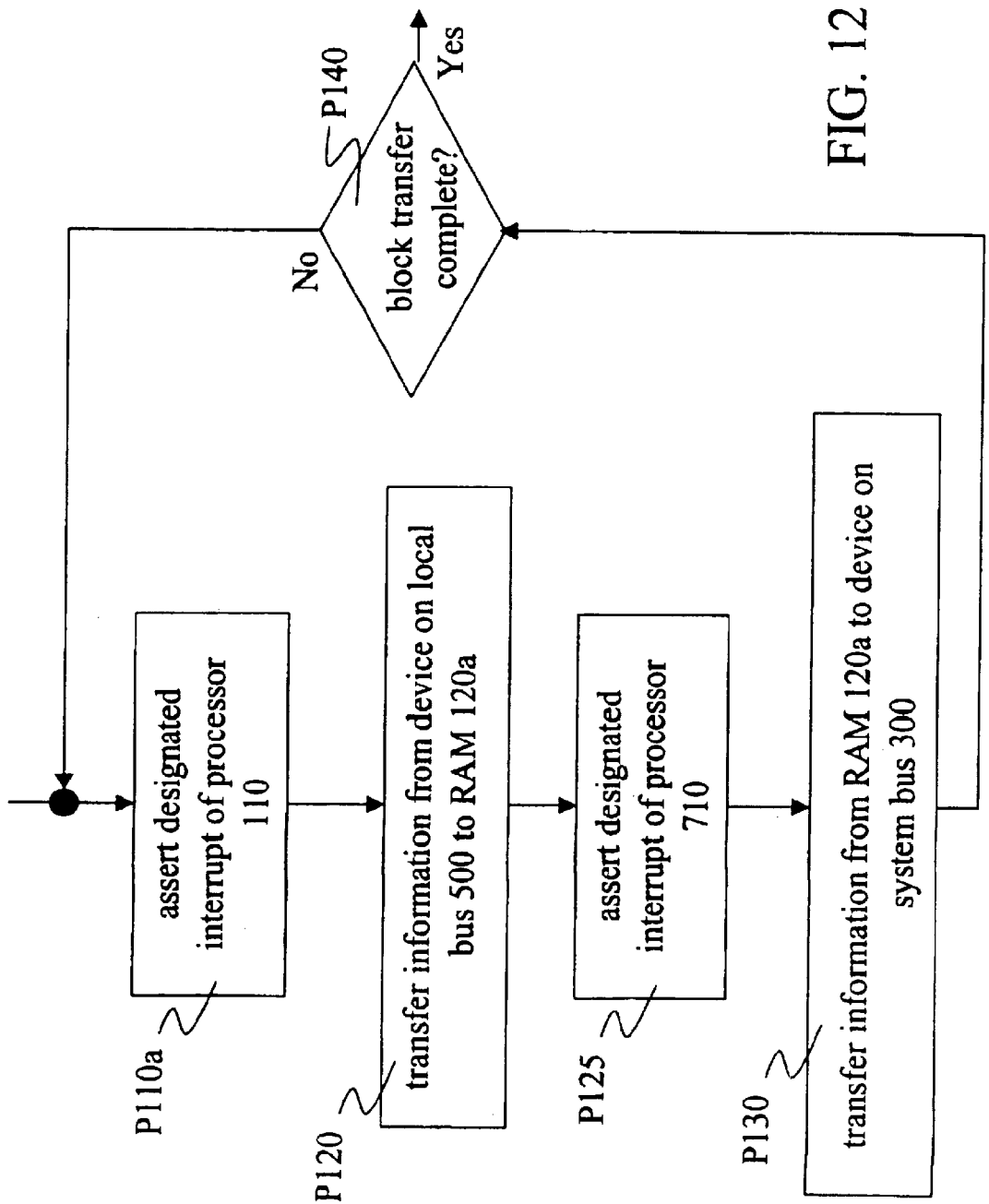
FIG. 12 shows a flow chart of a method according to an embodiment of the invention.

Depending on the capacities of area 120a and any storage area within RMD 700 that may be used to store transferred information, tasks P120 and/or P130 may be executed several times for each block of information (e.g. video frame) transferred. In FIG. 12, for example, buffer area 120a is smaller than the area required to store a video frame, so that tasks P120 and P130 must be executed more than once to transfer a complete video frame. In task P140, processor 710 determines whether a complete video frame has been transferred by, for example, (1) checking to see how many bytes have been transferred so far or (2) checking to see whether processor 110 (or another device such as bus controller 610 or 620) has indicated that the entire frame was transferred into buffer area 120a. Task P140 may also be performed by processor 110 and/or another device such as bus controller 610 or 620.

Figure 13:
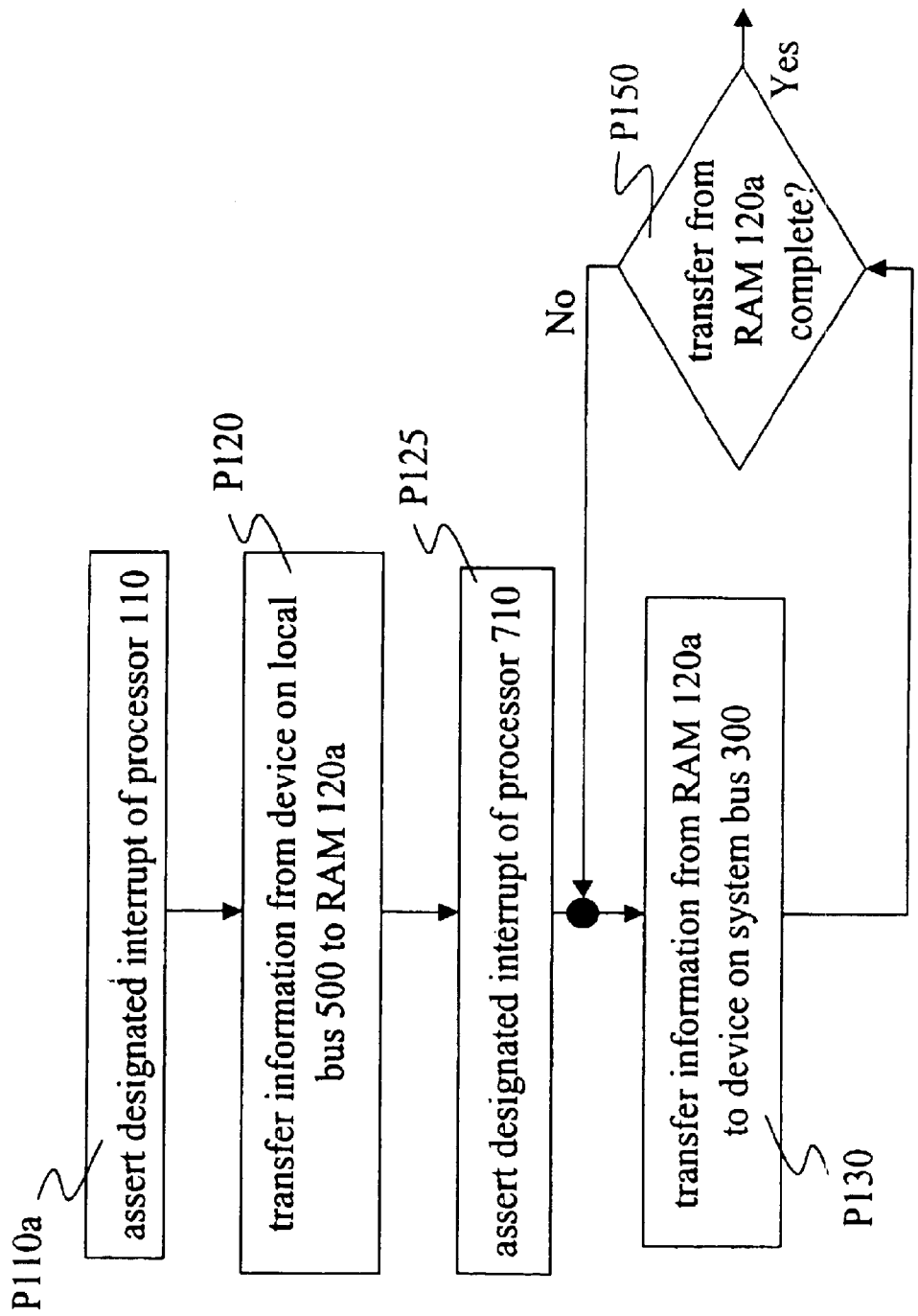
FIG. 13 shows a flow chart of a method according to an embodiment of the invention.
Figure 14:
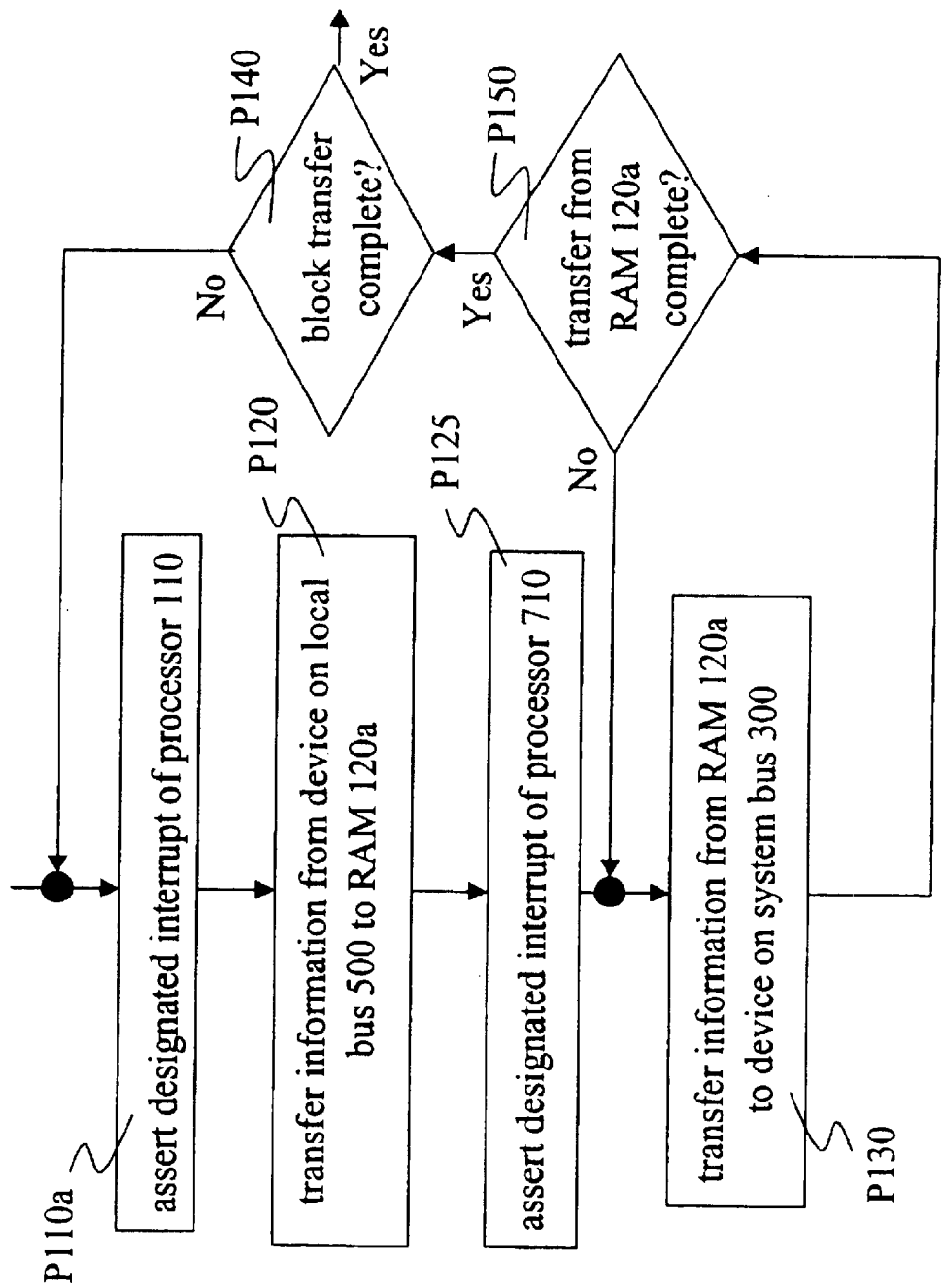
FIG. 14 shows a flow chart of a method according to an embodiment of the invention.

FIG. 13 shows a method for a case in which buffer area 120a is large enough to accommodate an entire block, but processor 710 does not transfer all of the data in area 120a at once (e.g. because of storage limits within RMD 700, or because of a slow connection to the remote user). In task P150, processor 710 determines whether the transfer from area 120a is complete by, for example, checking to see how many bytes have been transferred so far. In some implementations, it may be necessary to interrupt processor 710 again before executing task P130 if the test in task P150 fails. FIG. 14 shows a method for a case in which the capacity limitations discussed with reference to FIGS. 12 and 13 both apply.

In practicing an implementation as described above, it may be desirable to perform several exchanges of information between computer 100c, 100d and RMD 700. For example, additional information may be required to interpret data downloaded from a video buffer of LBVC 400 (e.g. information pertaining to screen dimensions and palette size). In one embodiment, separate interrupts of processor 110 may be designated and configured to correspond to different types of information. In an alternative embodiment, processor 710 constructs a message in a shared memory area and asserts the designated interrupt of processor 110. The corresponding ISR causes processor 110 to access the message and respond accordingly. For remote video monitoring, this message may have one of the following forms:

Get video mode: indicate whether screen is in text or graphics mode and/or return number of colors in palette (or pixel depth in bits)

Get screen size: indicate number of columns and rows (for text mode) or number of horizontal and vertical pixels (for graphics mode)

Get cursor position: indicate screen coordinates of cursor

Get video memory contents: return information from video buffer of LBVC 400.

Processor 110 constructs a reply to the message and posts it in the shared memory space. This message may comprise an identifying header followed by the forwarded information. Processor 110 then asserts the designated interrupt of processor 710 to indicate that a message is waiting. Processor 710 retrieves the message for local storage and/or delivery to a remote user. This procedure may be repeated until the desired block of information (along with any ancillary information) has been transferred to RMD 700. For example, successive messages sent by processor 710 may request successive portions of the desired block of information.

Figure 15:
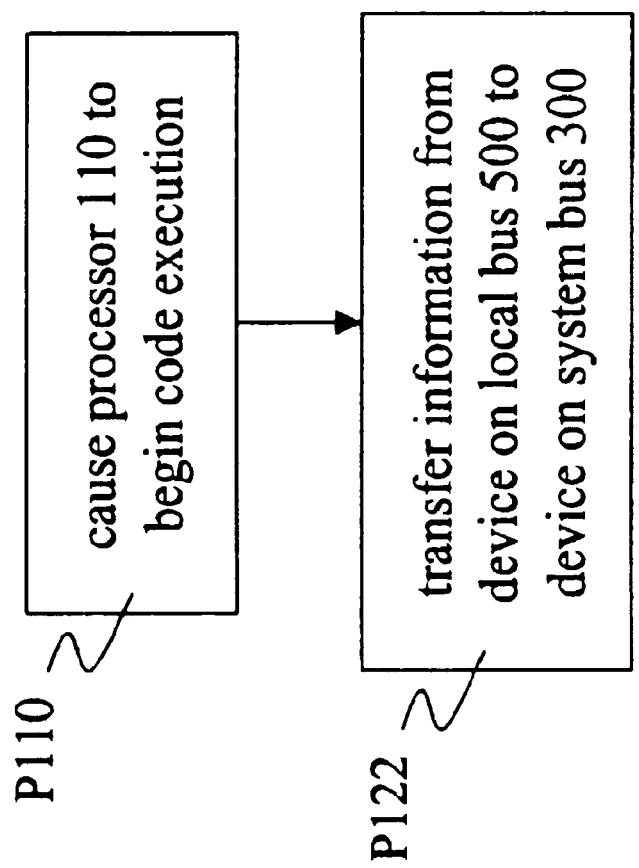
FIG. 15 shows a flow chart of a method according to an embodiment of the invention.
Figure 16:
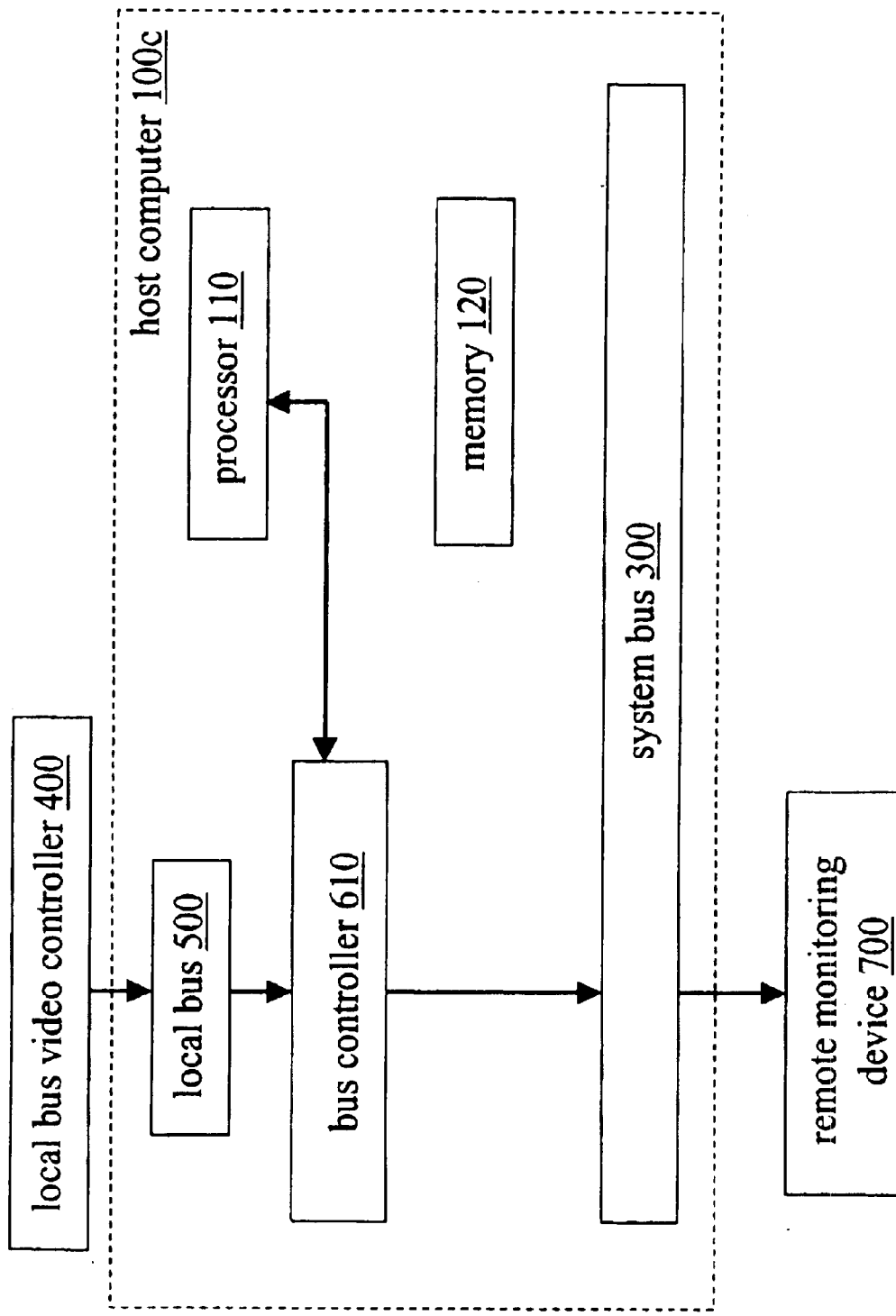
FIG. 16 shows a block diagram of a system according to an embodiment of the invention.
Figure 17:
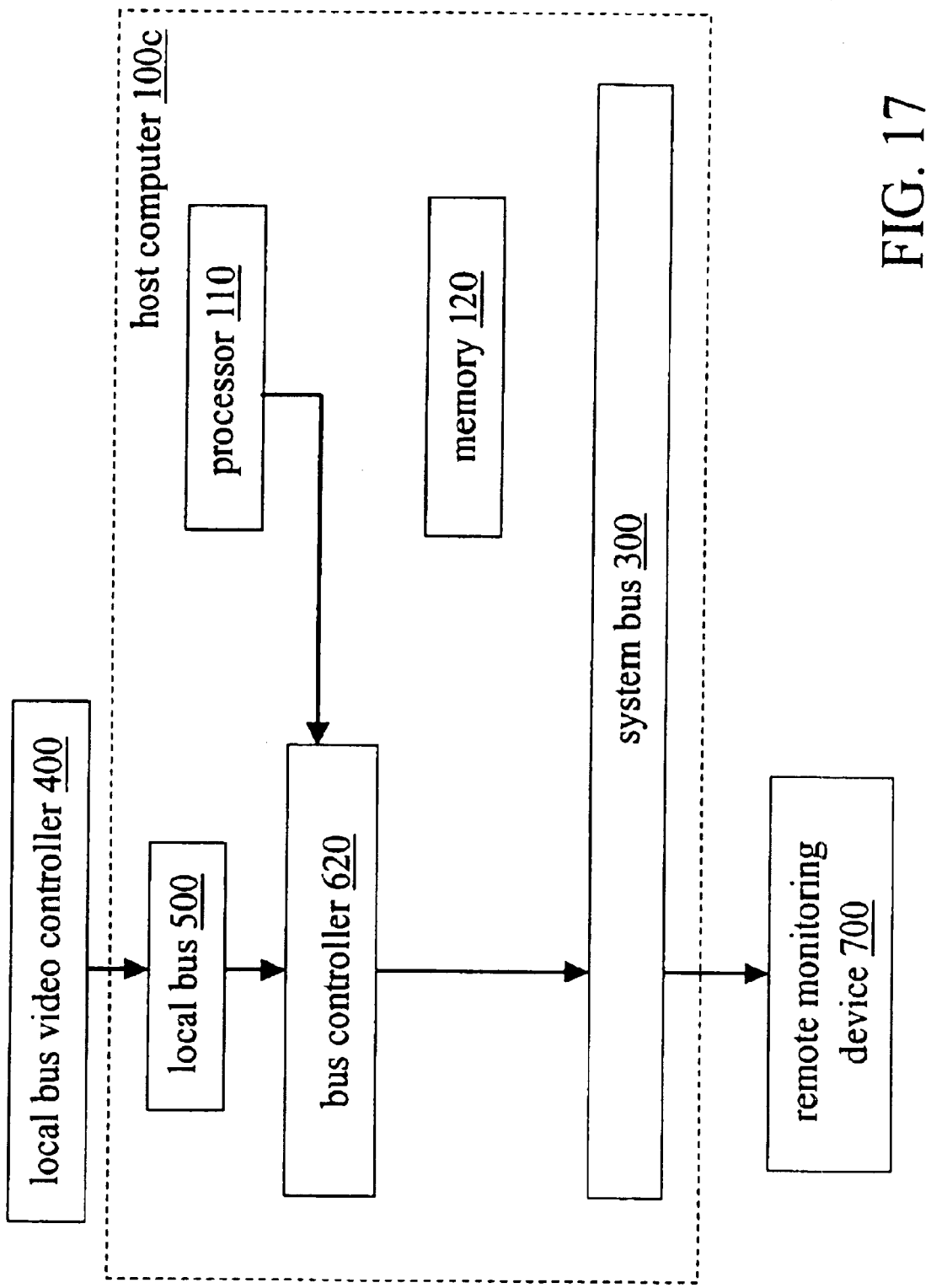
FIG. 17 shows a block diagram of a system according to an embodiment of the invention.

FIG. 15 shows a flowchart for a method according to an alternative embodiment of the invention. In this embodiment, the transfer of information from the device on local bus 500 to the device on system bus 300 is accomplished by processor 110 in one action (task P122). FIGS. 16 and 17 show the path of information from LBVC 400 to RMD 700 when this method is used with host computer 100c of FIG. 3 (wherein the transferred information passes through processor 110) and host computer 100d of FIG. 4 (wherein the transferred information does not pass through processor 110), respectively.

Figure 18:
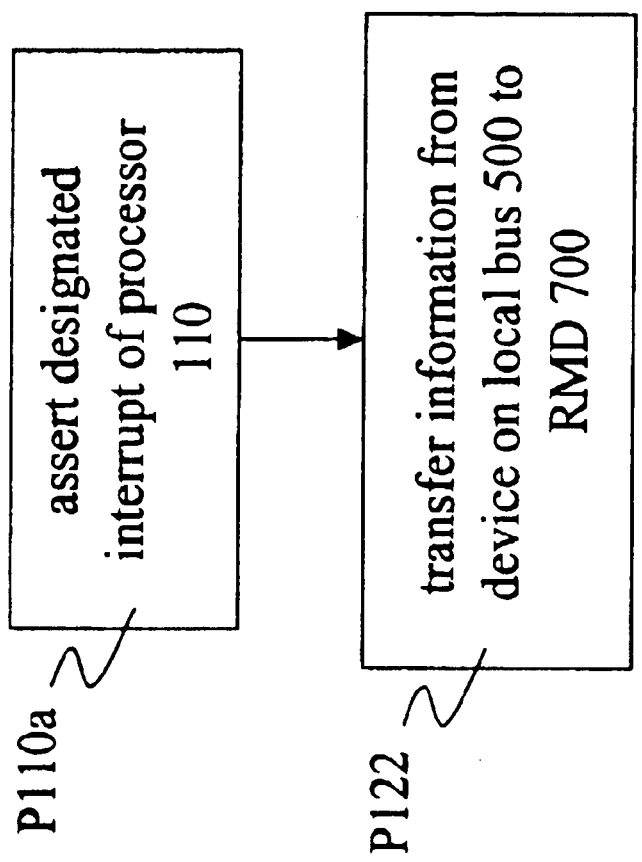
FIG. 18 shows a flow chart of a method according to an embodiment of the invention.
Figure 19:
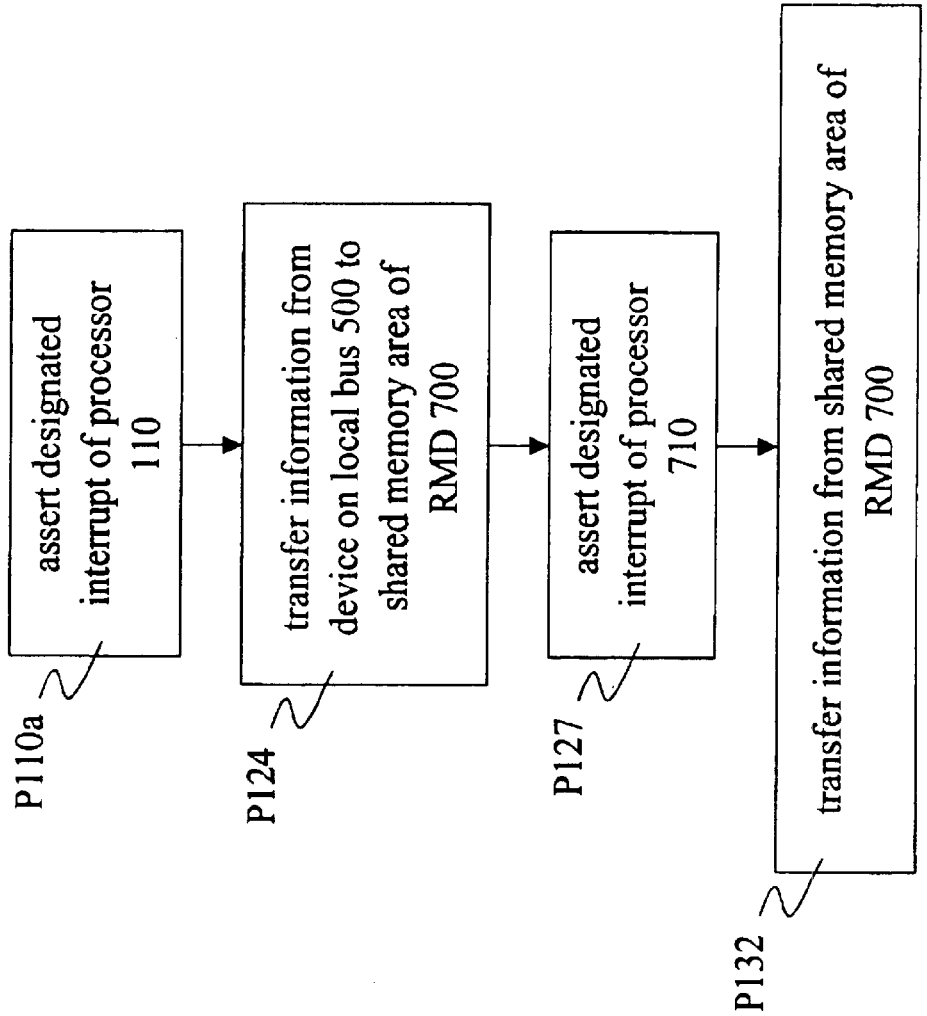
FIG. 19 shows a flow chart of a method according to an embodiment of the invention.

FIG. 18 shows one general implementation of this method, wherein event P110a is the assertion event described above. FIG. 19 shows a particular implementation wherein RMD 700 has a shared memory area (i.e. at least some of the memory of RMD 700 is mapped to a window in the main memory space of processor 110). In task P124, processor 110 transfers the information from the device on local bus 500 to the shared memory area. When the transfer has completed (or possibly as it continues), processor 110 asserts an interrupt of processor 710 (task P127). In task P132, processor 710 executes a transfer of the information out of the shared memory area. The transfer of task P132 may comprise a transfer into another portion of the memory of RMD 700 (e.g. to make room for another incoming transfer), wherein future processing tasks may include storing the information, forwarding it to the remote user, etc. The transfer of task P132 may also comprise transmission of the information to the remote user directly from the shared memory area.

Figure 20:
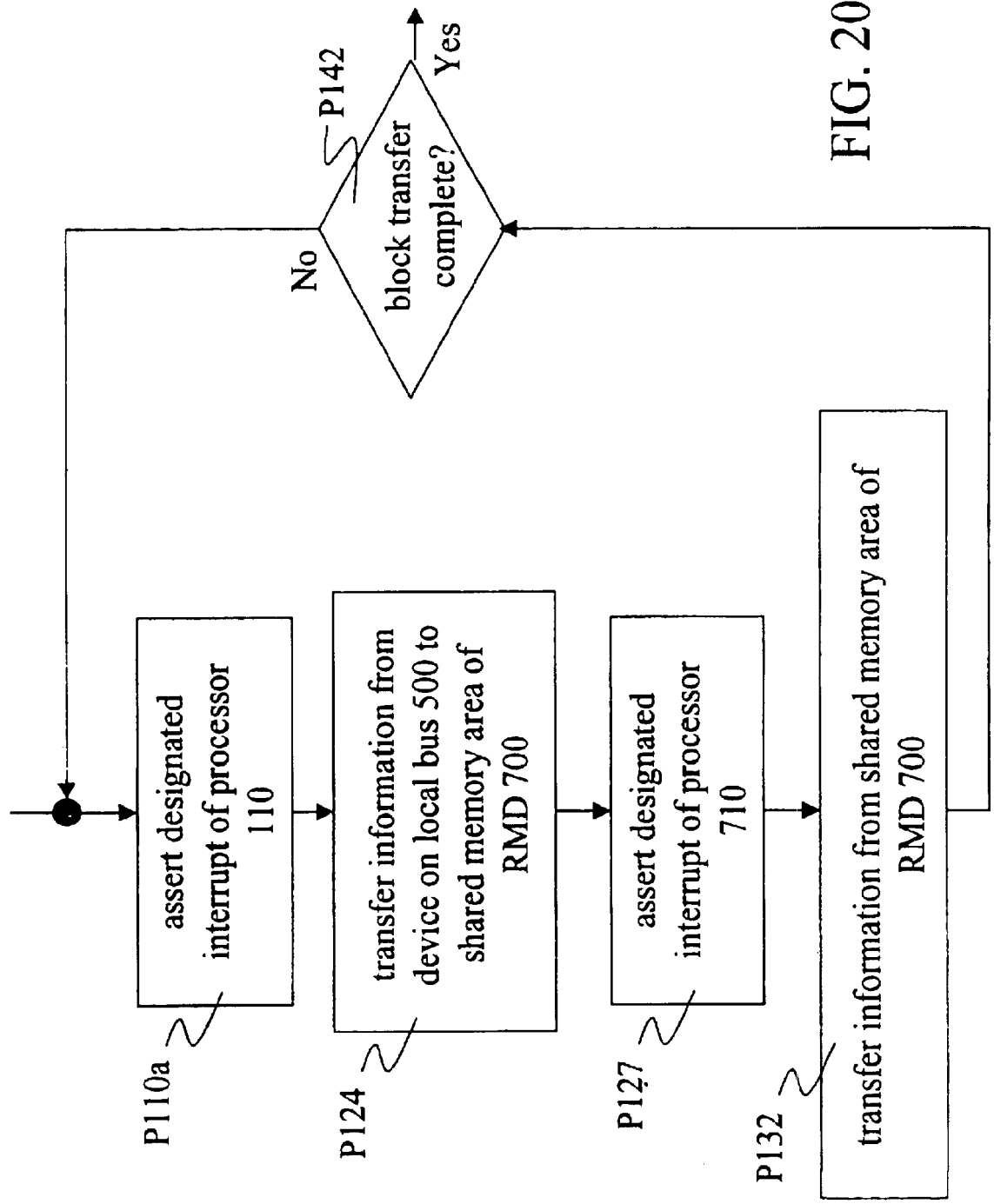
FIG. 20 shows a flow chart of a method according to an embodiment of the invention.

FIG. 20 shows a method for a case in which the shared memory area is too small to accommodate an entire block, such that tasks P124 and P132 must be executed more than once to transfer an entire block. In task P142, processor 710 (or another device such as processor 110 or bus controller 610 or 620) evaluates the status of the transfer as described above with respect to task P140.

Figure 21:
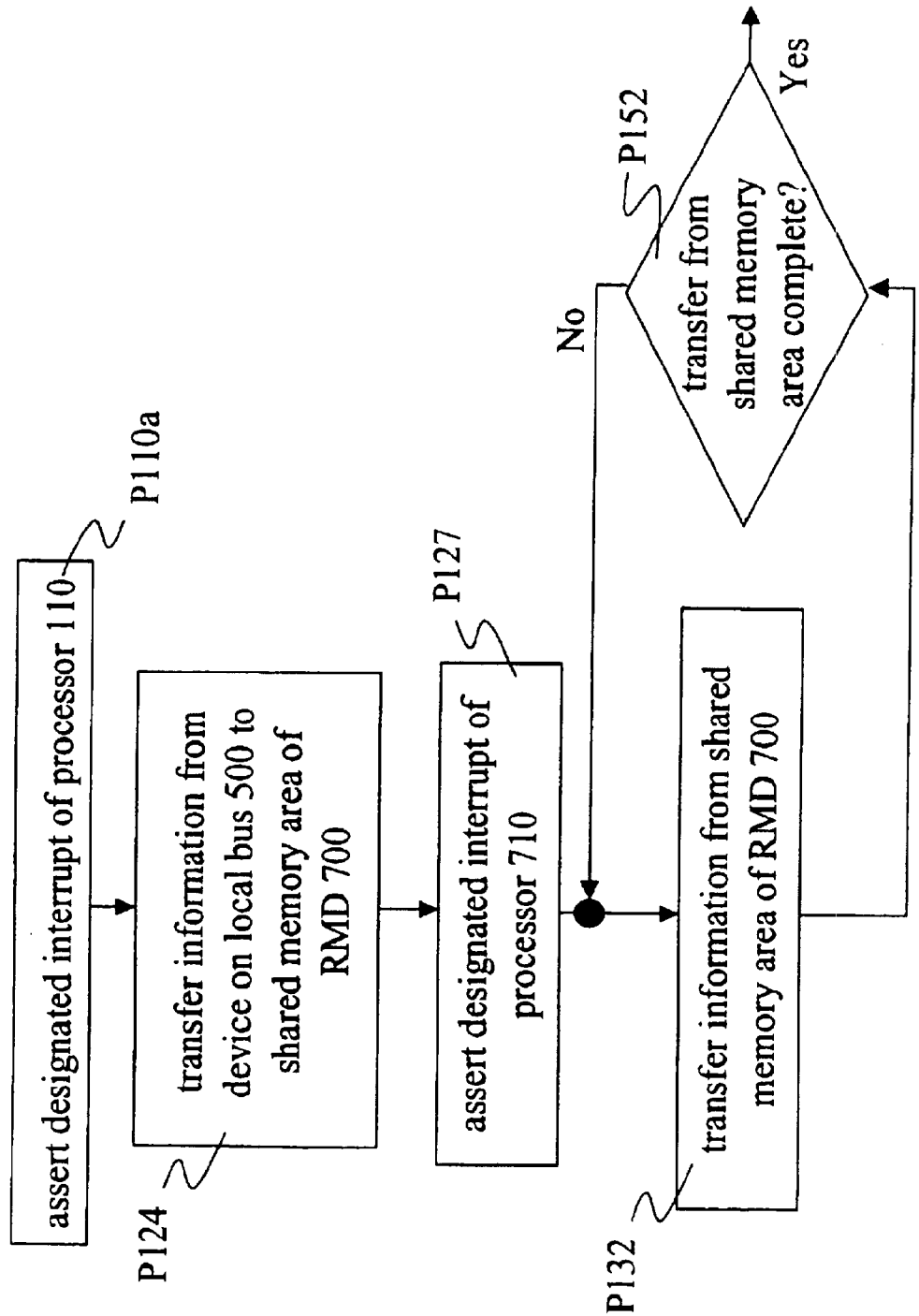
FIG. 21 shows a flow chart of a method according to an embodiment of the invention.
Figure 22:
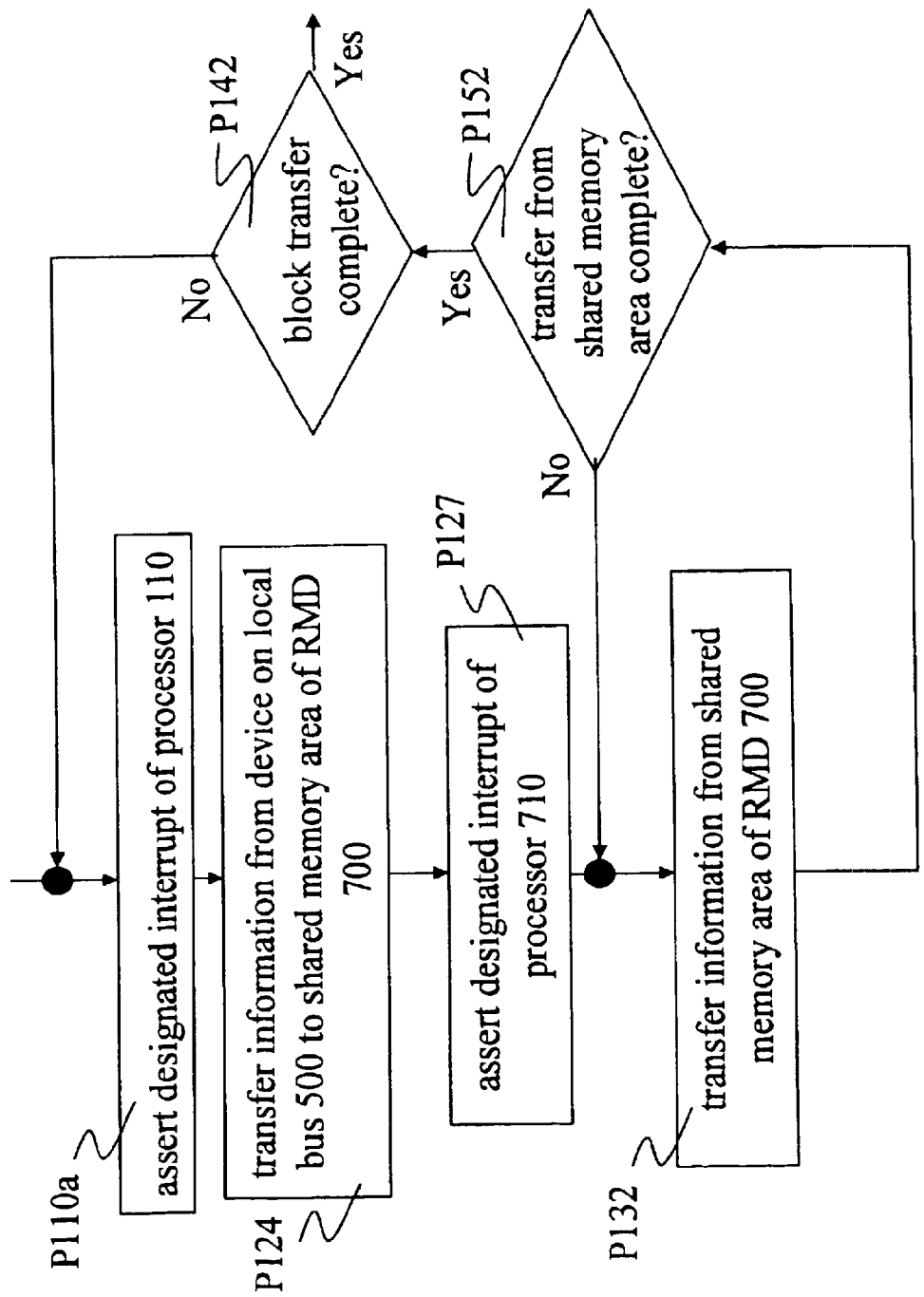
FIG. 22 shows a flow chart of a method according to an embodiment of the invention.

FIG. 21 shows a method for a case in which the shared memory area is large enough to accommodate an entire block, but processor 710 does not transfer all of the information from it at once (e.g. because of bandwidth limitations). In task P152, processor 710 determines whether the transfer from the shared memory area is complete by, for example, checking to see how many bytes have been transferred so far. In some implementations, it may be necessary to interrupt processor 710 again before executing task P132 if the test in task P152 fails. FIG. 22 shows a method for a case in which the capacity limitations discussed with reference to FIGS. 20 and 21 both apply.

Note that a message mechanism as described above may also be used with implementations of the method of FIG. 15. For example, processor 710 may construct and post the message before asserting the interrupt of processor 110. Upon completing the transfer (and possibly posting a reply message), processor 110 may interrupt processor 710 to indicate that the requested information (or some portion of it) is available in the shared memory area.

Once an operating system of computer 100c begins to load, it is possible that an ISR associated with the designated interrupt of processor 110 will no longer function. If processor 110 is an Intel x86 processor, for example, the BIOS configuration may execute in 'real mode,' with processor 110 having access to only a limited portion of its total memory space. Loading the operating system may cause the processor to enter 'protected mode,' thereby obtaining a wider access to the memory space but also losing access to the existing 'real-mode' interrupt vector configuration. Although the interrupts may then be reconfigured to execute similar ISRs in 'protected mode,' a malfunction of the operating system may cause this configuration to become unavailable as well (e.g. by causing the interrupts to be masked). It is desirable for remote monitoring capabilities to remain available during loading of the operating system as well as during and after a malfunctioning of the operating system.

Figure 23:
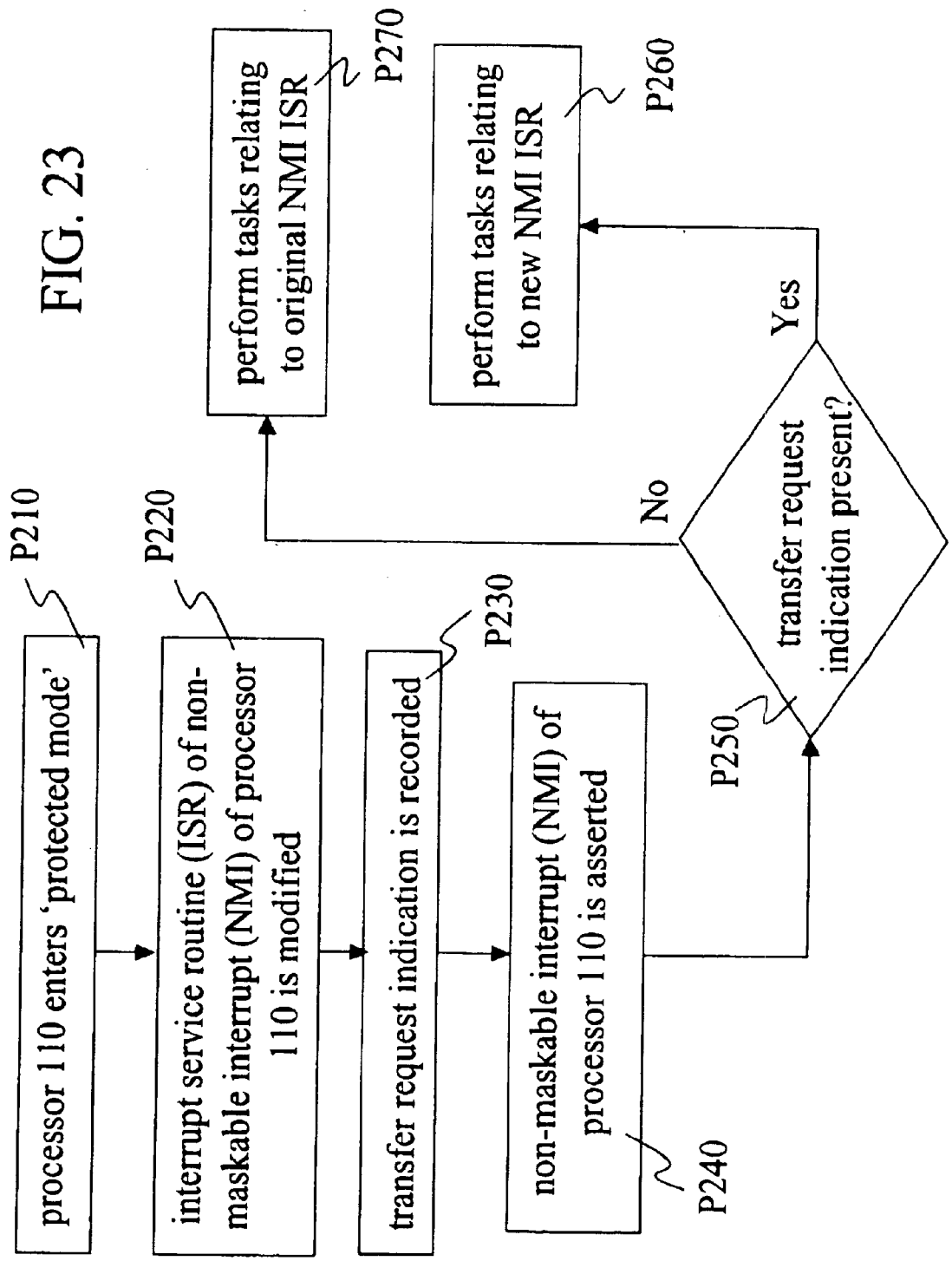
FIG. 23 shows a flow chart of a method according to an embodiment of the invention.

A method according to an embodiment of the invention continues to support requests for cross-bus transfers both during and after loading of the operating system (i.e. after processor 110 enters 'protected mode,' event P210 of FIG. 23) by modifying the ISR for a non-maskable interrupt (NMI) of processor 110 (task P220). The NMI, which may be a feature of both Intel and non-Intel processors, is distinguished from other interrupts in that the NMI remains operational when another interrupt line or lines of the processor are masked.

Computer 100c may use the NMI to indicate certain system conditions, such as a memory parity error. Before asserting the NMI, a device desiring to initiate a cross-bus transfer according to the general implementation will record a transfer request indication in an area that is accessible to processor 110 (task P230). For example, a message constructed by processor 710 as described above may serve as such an indication.

Upon assertion of the NMI (event P240), processor 110 begins to execute the modified NMI ISR. In executing this code, processor 110 tests whether a transfer request indication is present (task P250). If no such indication is found, then it is assumed that the NMI was asserted in response to a system condition such as a parity error, and processor 110 is directed to perform tasks relating to the original NMI ISR (task P270). Note that it may be possible to perform task P270 simply by directing processor 110 to the starting location of the original NMI ISR. If a transfer request indication is found, then processor 110 is directed to perform tasks relating to the requested transfer, as described above (task P260). Note that although these tasks may be similar or even identical to those described above (e.g. with respect to tasks P120 and/or P130), it may not be possible to direct processor 110 to execute the same code in order to perform those tasks, as that code may be incompatible with a present mode of processor 110.

In a general implementation of a method according to an embodiment of the invention, code for modifying an ISR of a NMI of processor 110 is packaged as a device driver. This driver is loaded by an operating system of computer 100c into a RAM portion of memory 120 (e.g. from a ROM, from a hard drive within computer 100c, or over a network connection) for execution by processor 110. In executing this code, processor 110 causes the ISR of the NMI to be modified (task P220).

It is desirable to restore the availability of cross-bus transfers as quickly as possible after processor 110 enters 'protected mode' (event P210). Such availability may be obtained by causing processor 110 to modify the NMI ISR as early as possible in the boot process of the operating system. Different particular implementations may be practiced to obtain such early modification depending on which operating system is booting. For a case in which the operating system is Windows NT™ (Microsoft Corp., Redmond, Wash.), it is possible to cause processor 110 to load and execute the device driver during the phase immediately following firmware execution by declaring the driver to be a 'system bus extender.' This declaration may be achieved by configuring the operating system's registry in computer 100c to assign the driver a \Services\DriverName\Start value of SERVICE_BOOT_START (0x0).

For a case in which the operating system is Netware (Novell Corp., San Jose, Calif., Provo, Utah), early loading and execution of the configuration driver may be obtained by listing the driver as the first file in startup and in the configuration files of the operating system. In this case it may be necessary to list the driver as a disk driver during linking and to avoid the use of any external libraries during compilation of the driver (i.e. to call only those functions that are native to the operating system).

As described above, a system, method, and apparatus according to an embodiment of the invention allows cross-bus transfers of information to be conducted (e.g. as needed to perform remote monitoring of the video output of a computer) regardless of whether the operating system has loaded correctly or at all. Such capabilities as the remote selection of an operating system for booting and the remote execution of command-line repair tools and the like are thereby supported.

The foregoing description of the preferred embodiments is provided to enable any person skilled in the art to make or use the present invention. Various modifications to these embodiments are possible, and the generic principles presented herein may be applied to other embodiments as well. For example, the invention may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit.

Note that instead of directly performing one or more of the information transfers indicated in tasks P120, P122, P124, P130, and P132, processors 110 and/or 710 may also cause these transfers by sending data which identify the source and destination addresses to another device (such as bus controller 610 or 620) along with a command to effect the transfer.

Although the invention is described principally in terms of allowing remote access to video memory on a local device, the invention may be practiced in many other situations wherein it is desired for a first device peripheral to a host processor to access information stored in or available at a second device peripheral to the host processor, and wherein a direct access of the second device by the first device is prevented or restricted. Thus, the present invention is not intended to be limited to the embodiments shown above but rather is to be accorded the widest scope consistent with the principles and novel features disclosed in any fashion herein.

We claim:

1. An apparatus comprising:
   a data medium having instruction information, the instruction information including transfer instructions, the transfer instructions being instructions to transfer video information relating to a video controller from the video controller to an area of common access, said video controller being on a first bus of a host computer to generate the video information, wherein the first bus has a first operating speed; and
   a bus connector to couple the apparatus to a second bus of the host computer;
   wherein the apparatus is configured to induce the host computer to transfer at least a portion of the instruction information to a main memory of the host computer over the second bus before an operating system of the host computer begins to boot, the second bus having a second operating speed that is different than the first operating speed,
   wherein the portion of the instruction information includes the transfer instructions and second transfer instructions, said second transfer instructions being instructions to transfer the video information relating to the video controller of the host computer from the area of common access to the apparatus, the apparatus being an external remote video monitoring device coupled to said second bus to receive the video information from the video controller and to display the video information relating to the video controller locally on the external remote video monitoring device to permit remote monitoring of the video information output from the video controller, and
   wherein the video information is transferred regardless of whether the operating system has correctly loaded, and the apparatus provides for
      a remote selection of the operating system for booting, and
      a remote execution of command-line repair tools, and
   the apparatus has access to contents of a memory of the video controller on the first bus during substantially all stages of operation of the host computer.

2. The apparatus according to claim 1, the instruction information further including instructions to install the transfer instructions as an interrupt handler associated with an interrupt of a processor of the host computer.

3. The apparatus according to claim 1, said data medium comprising the area of common access.

4. The apparatus according to claim 3, said data medium comprising a read-only memory and a random-access memory,
   wherein the read-only memory has the instruction information, and
   wherein the random-access memory comprises the area of common access.

5. The apparatus according to claim 3, wherein the second bus is a Peripheral Component Interconnect (PCI) bus.

6. The apparatus according to claim 5, wherein the first bus is an Accelerated Graphics Port (AGP) bus.

7. A system, comprising:
   a host computer, said host computer including a first bus and a second bus, wherein the first bus has a first operating speed and the second bus has a second operating speed that is different than the first operating speed;
   a video controller coupled to said first bus, said video controller outputting video information; and
   an external remote video monitoring device coupled to said second bus, said external remote video monitoring device including a data medium having instruction information, the instruction information including transfer instructions, the transfer instructions being instructions to transfer at least a part of the video information from the video controller to an area of common access,
   wherein said external remote video monitoring device is configured to induce the host computer to transfer at least a portion of the instruction information to a main memory of the host computer over the second bus before an operating system of the host computer begins to boot,
   wherein the portion of the instruction information includes the transfer instructions and second transfer instructions, said second transfer instructions being instructions to transfer at least a part of the video information from the area of common access to the external remote video monitoring device that receives the video information from the video controller to display the video information relating to the video controller locally on the external remote video monitoring device to permit remote monitoring of the video information output from the video controller, and
   wherein the video information is transferred regardless of whether the operating system has correctly loaded, and the apparatus provides for a remote selection of the operating system for booting, and a remote execution of command-line repair tools, and the external remote video monitoring device has access to contents of a memory of the video controller on the first bus during substantially all stages of operation of the host computer.

8. The system according to claim 7, the instruction information further including instructions to install the transfer instructions as an interrupt handler associated with an interrupt of a processor of the host computer.

9. The system according to claim 7, said data medium comprising the area of common access.

10. The system according to claim 9, said data medium comprising a read-only memory and a random-access memory, wherein the read-only memory has the instruction information, and wherein the random-access memory comprises the area of common access.

11. The system according to claim 9, wherein the second bus is a Peripheral Component Interconnect (PCI) bus.

12. The system according to claim 11, wherein the first bus is an Accelerated Graphics Port (AGP) bus.

13. A method of remotely monitoring video output, comprising:

executing transfer instructions, the transfer instructions being instructions to transfer video information from a video controller to an area of common access, said video controller being on a first bus of a host computer and generates the video information, wherein the first bus has a first operating speed; and transferring instruction information from an external remote video monitoring device to a main memory of the host computer over a second bus, wherein the second bus has a second operating speed that is different than the first operating speed, wherein the instruction information includes the transfer instructions and second transfer instructions, said second transfer instructions being instructions to transfer the video information relating to the video controller from the area of common access to the external remote video monitoring device coupled to said second bus to receive the video information from the video controller and to display the video information relating to the video controller locally on the external remote video monitoring device to permit remote monitoring of the video information output from the video device, wherein transferring the instruction information occurs before an operating system of the host computer begins to boot, and wherein the video information is transferred regardless of whether the operating system has correctly loaded, and the apparatus provides for a remote selection of the operating system for booting, and a remote execution of command-line repair tools, and the external remote video monitoring device has access to contents of a memory of the video controller on the first bus during substantially all stages of operation of the host computer.

14. The method according to claim 13, wherein transferring the instruction information further comprises installing the transfer instructions as an interrupt handler associated with an interrupt of a processor of the host computer.

15. The method according to claim 13, the remote video monitoring device including the area of common access.

16. The method according to claim 15, the remote video monitoring device including a read-only memory and a random-access memory, wherein the read-only memory has the instruction information, and wherein the random-access memory comprises the area of common access.

17. The method according to claim 15, wherein the second bus is a Peripheral Component Interconnect (PCI) bus.

18. The method according to claim 17, wherein the first bus is an Accelerated Graphics Port (AGP) bus.

19. A data storage medium having machine-readable code stored thereon, the machine-readable code including instructions executable by an array of logic elements, the instructions defining a method comprising:

executing transfer instructions, the transfer instructions being instructions to transfer video information from a video controller to an area of common access, said video controller being on a first bus of a host computer and generates the video information, wherein the first bus has a first operating speed; and transferring instruction information from an external remote video monitoring device to a main memory of the host computer over a second bus, wherein the second bus has a second operating speed that is different than the first operating speed, wherein the instruction information includes the transfer instructions and second transfer instructions, said second transfer instructions being instructions to transfer the video information relating to the video controller from the area of common access to the external remote video monitoring device coupled to said second bus to receive the video information from the video controller and to display the video information relating to the video controller of the host computer locally on the external remote video monitoring device to permit remote monitoring of the video information output from the video controller, wherein transferring the instruction information occurs before an operating system of the host computer begins to boot, and wherein the video information is transferred regardless of whether the operating system has correctly loaded, and the apparatus provides for a remote selection of the operating system for booting, and a remote execution of command-line repair tools, and the external remote video monitoring device has access to contents of a memory of the video controller on the first bus during substantially all stages of operation of the host computer.

20. The medium according to claim 19, wherein transferring the instruction information further comprises installing the transfer instructions as an interrupt handler associated with an interrupt of a processor of the host computer.

21. The medium according to claim 19, the remote video monitoring device including the area of common access.

22. The medium according to claim 21, the remote video monitoring device including a read-only memory and a random-access memory, wherein the read-only memory has the instruction information, and wherein the random-access memory comprises the area of common access.

23. The medium according to claim 21, wherein the second bus is a Peripheral Component Interconnect (PCI) bus.

24. The medium according to claim 23, wherein the first bus is an Accelerated Graphics Port (AGP) bus.

25. An apparatus comprising:

a data medium having instruction information, the instruction information including transfer instructions, the transfer instructions being instructions to transfer video information relating to a video controller from the video controller to an area of common access, said video controller being on a first bus of the host computer to generate the video information, wherein the first bus has a first operating speed; and a bus connector to couple the apparatus to a second bus of the host computer, wherein the second bus has a second operating speed than the first operating speed;

wherein the apparatus is configured to induce the host computer to transfer at least a portion of the instruction information to the main memory of the host computer over the second bus before an operating system of the host computer begins to boot, wherein the portion of the instruction information includes the transfer instructions and second transfer instructions, said second transfer instructions being instructions to transfer the video information relating to the video controller from the area of common access to the apparatus, the apparatus being an external remote video monitoring device coupled to said second bus to receive the video information from the video controller and to display the video information relating to the video device locally on the external remote video monitoring device to permit remote monitoring of the video information output from the video controller, and wherein the video information is transferred when the operating system has incorrectly loaded, and the apparatus provides for a remote selection of the operating system for booting, and a remote execution of command-line repair tools, and the apparatus has access to contents of a memory of the video controller on the first bus during substantially all stages of operation of the host computer.

* * * * *